(12) United States Patent
Shih

(10) Patent No.: US 7,277,815 B2
(45) Date of Patent: Oct. 2, 2007

(54) TEST INTERFACE CARD

(76) Inventor: Yu-Chiang Shih, 14F-2, No. 268, Sec. 2, Pei-Hsin Road, Hsintien City, Taipei Hsien (TW)

( * ) Notice: Subject to any disclaimer, the term of this patent is extended or adjusted under 35 U.S.C. 154(b) by 0 days.

(21) Appl. No.: 11/160,770

(22) Filed: Jul. 8, 2005

(65) Prior Publication Data
US 2007/0010962 A1    Jan. 11, 2007

(51) Int. Cl.
*G01M 19/00* (2006.01)
(52) U.S. Cl. ..................................... 702/122
(58) Field of Classification Search ............... 702/122
See application file for complete search history.

(56) References Cited
U.S. PATENT DOCUMENTS 6,321,174 B1 * 11/2001 Chen et al. ............... 702/122
6,363,452 B1 * 3/2002 Lach ......................... 710/316
2002/0147924 A1 * 10/2002 Flyntz ....................... 713/200

* cited by examiner

*Primary Examiner*—Hal Wachsman
*Assistant Examiner*—Demetrius Pretlow
(74) *Attorney, Agent, or Firm*—Bacon & Thomas, PLLC

(57) ABSTRACT

A test interface card for use in a test host without a hot plug function includes a Bus power control circuit; a microcontroller for sensing a control status of the Bus power control circuit and transmitting a sensing result to the test host; a PCI slot; and a PCI Bus connected to the microcontroller and to a PCI slot of the test host. The Bus power control circuit controls power supply to the PCI slot and the PCI slot is adapted to connect with a test audio-video device. A switch controls and emits an on/off signal to the Bus power control circuit for selectively cutting the power supply to the PCI slot so that testing of the audio-video device can be implemented without shutting down the test host.

8 Claims, 31 Drawing Sheets

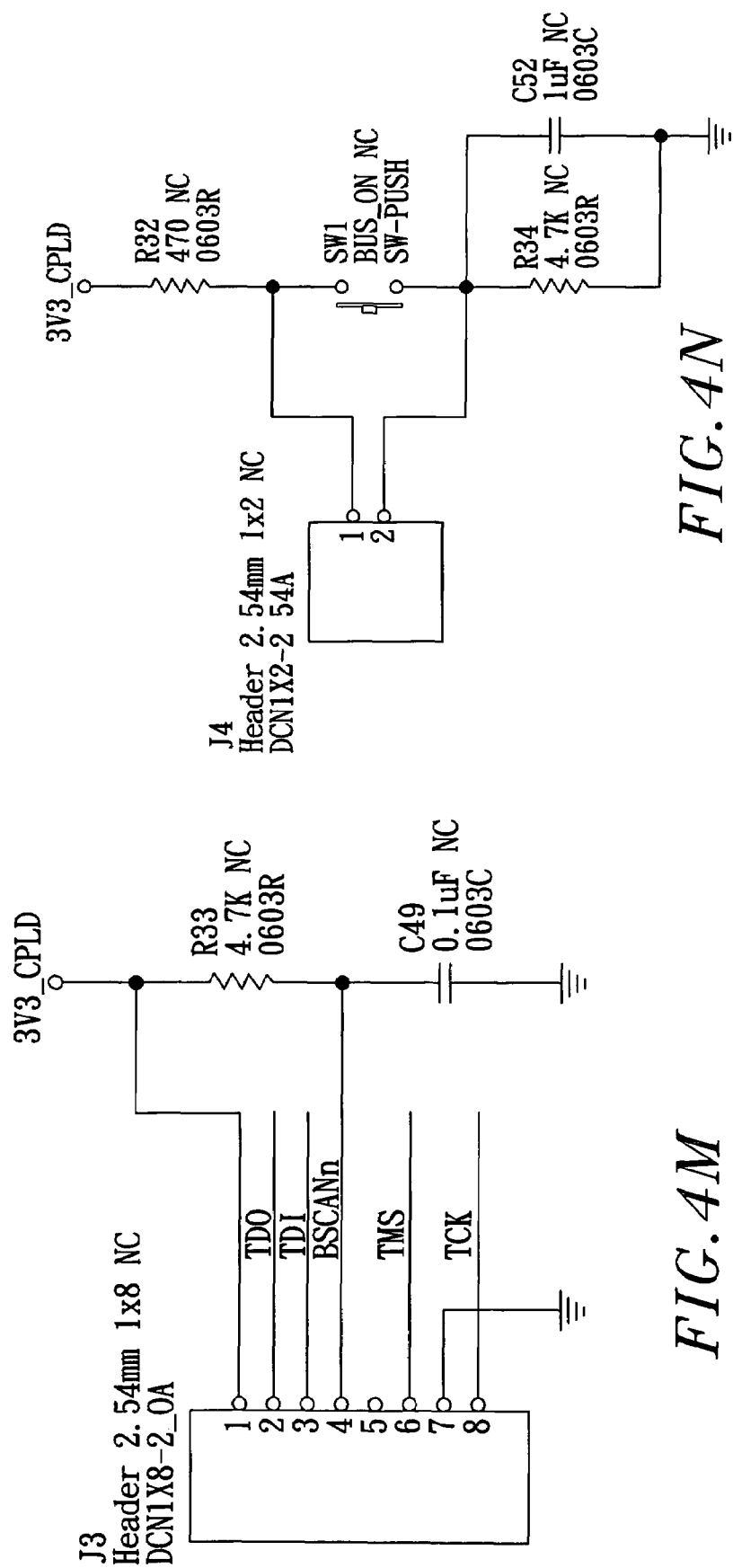

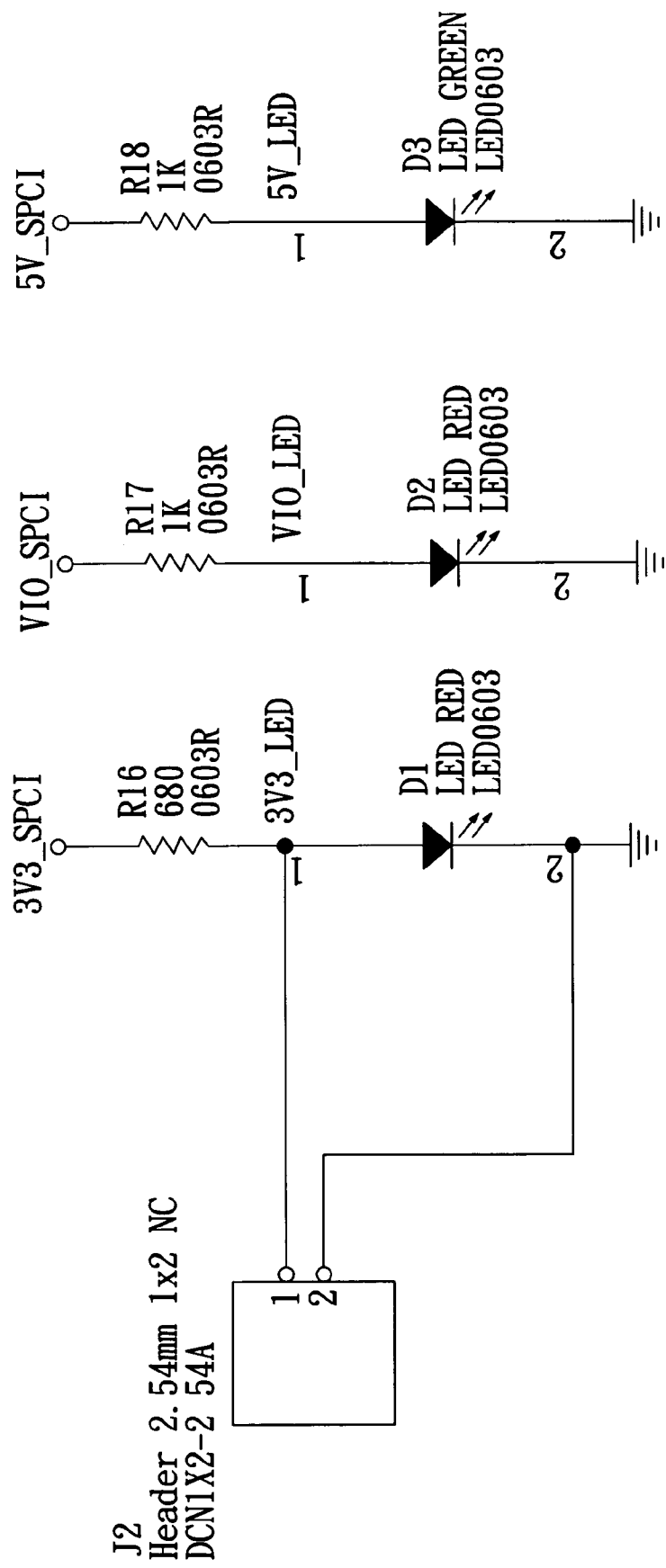

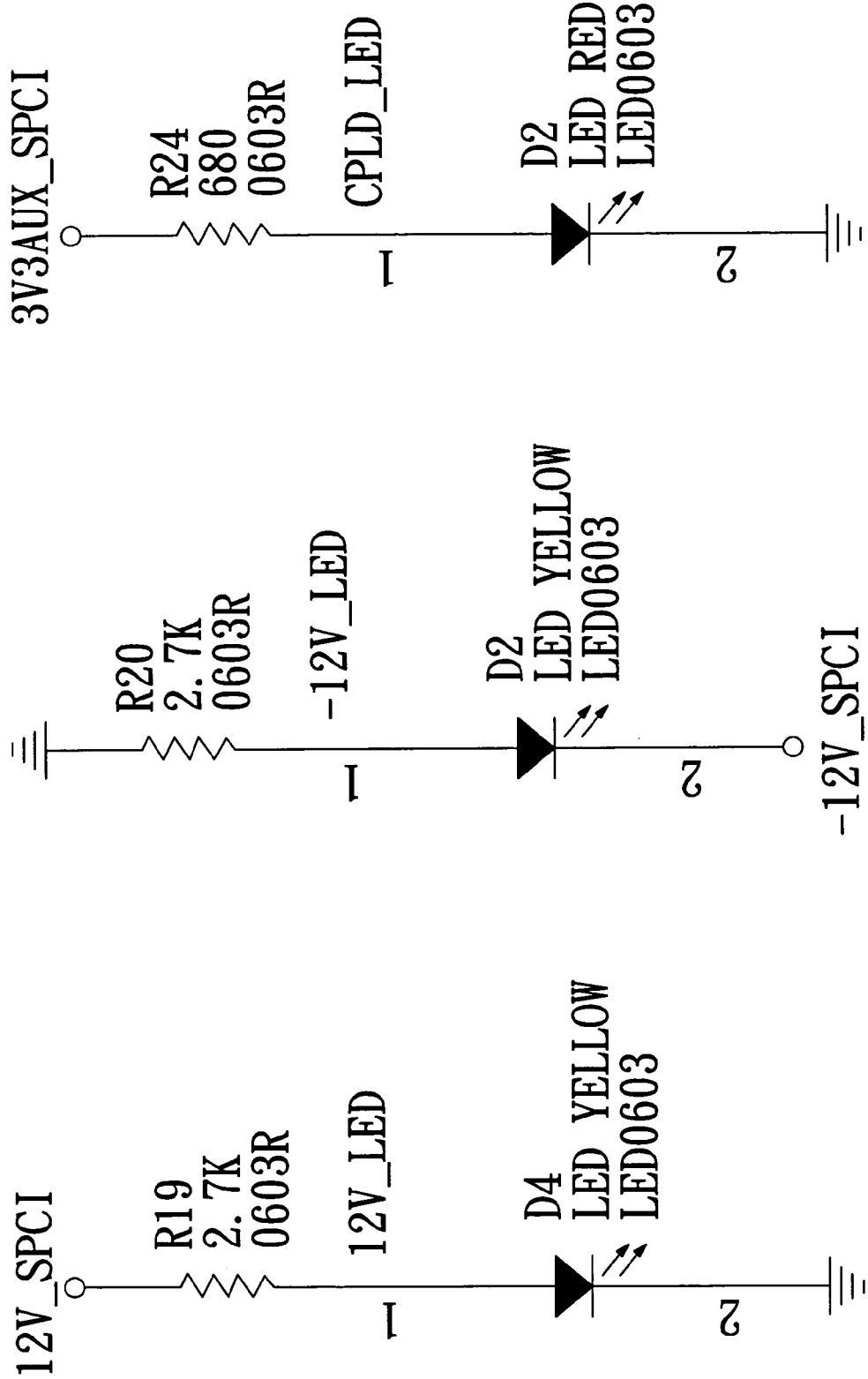

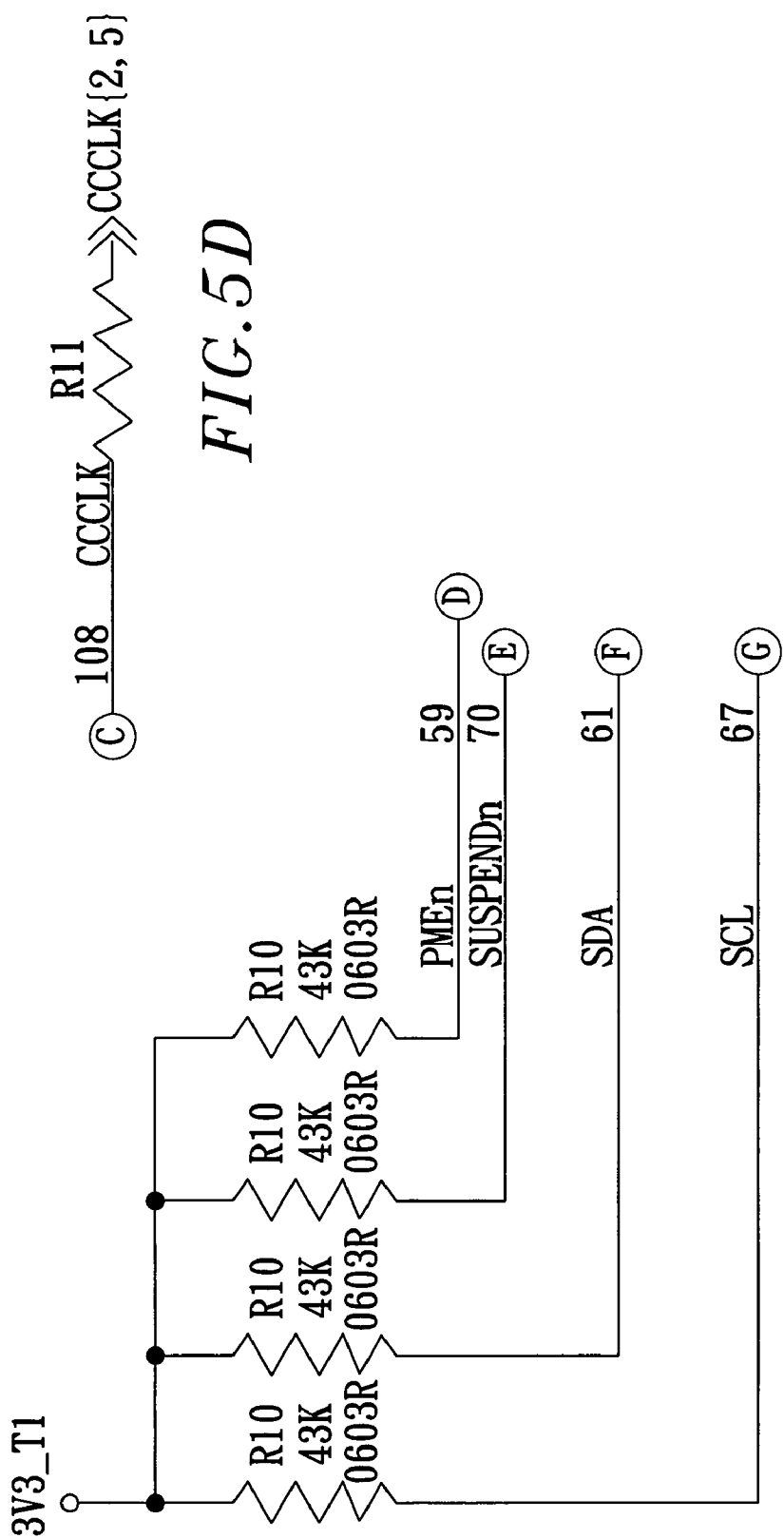

TEST INTERFACE CARD

BACKGROUND OF THE INVENTION

1. Field of the Invention

The present invention relates to a test interface card, and more particularly, to a test interface card capable of enabling a test host without hot plug function to perform a hot plug function, and also avoid turning off the test host each time when an audio-video device is required to be tested.

2. Description of the Related Art

Recently, the household entertainment electronic appliances, such as VCD, DVD, stereo system, are gradually being replaced by computer systems due to rapid development of computer technology. Accordingly, a desktop computer may provide visional and sound entertainment to users. The computer could function as both TV set and stereo system with quality comparable to common household electronic appliances. For watching TV via computer, the computer should be equipped with audio-video device, for example, TV card or TV box, for receiving TV signal. Thus, audio-video device is very essential for computer to function as TV.

Nowadays, peripheral component interconnection (PCI) interface is widely used; the latest audio-video devices mostly use the PCI interface to communicate with the host. For proper functioning of the computer product, a test is usually performed in order to ensure the quality of the audio-video device. Referring to FIGS. 1 and 2, the conventional testing method of the audio-video device A comprises: shutting down the host B; plugging the PCI Bus A1 of the audio-video device A into the PCI slot B1 of the host B; and turning on the host B; for executing the test on the audio-video device A. After the completion of the test, the audio-video device A may be unplugged from the host B.

However, the conventional test procedure described above has several defects described as follows.

1. Because the PCI interface does not contain hot plug function, which is adopted for supporting the host B for enabling the host B to accept or release the interface card without the need of turning off the power, therefore the host B must be shut down before plugging-in or unplugging the audio-video device A. Thus, the time and the cost for running the test are accordingly increased.

2. The conventional host B inquires an additional circuit for supporting the PCI interface with the hot plug function, which is present in only the higher level server contents computer host with hot plug function. However, the cost of the higher level server is much higher compared to the common personal computer.

Therefore, how to produce a low cost host without hot plug function to perform a hot plug function is an important issue for the manufacturers in the field.

SUMMARY OF THE INVENTION

Accordingly, in the view of the foregoing, the present inventor makes a detailed study of related art to evaluate and consider, and uses years of accumulated experience in this field, and through several experiments, to create a test interface card for enabling a test host without hot plug function to perform the hot plug function.

According to an aspect of the present invention, the test interface card is connected to the test host without hot plug function and then the test is directly run on the audio-video device. Thus, the test interface card allows testing of the audio-video device without shutting down the test host, therefore, the time and cost of testing may be effectively reduced.

According to another aspect of the present invention, the test interface card is utilized for connecting to the test host, therefore the test host without hot plug function can perform the hot plug function. Therefore, overall cost for testing can be effectively reduced.

BRIEF DESCRIPTION OF THE DRAWINGS

For a more complete understanding of the present invention, reference will now be made to the following detailed description of preferred embodiments taken in conjunction with the accompanying drawings, in which.

DESCRIPTION OF THE PREFERRED EMBODIMENTS

Figure 1:
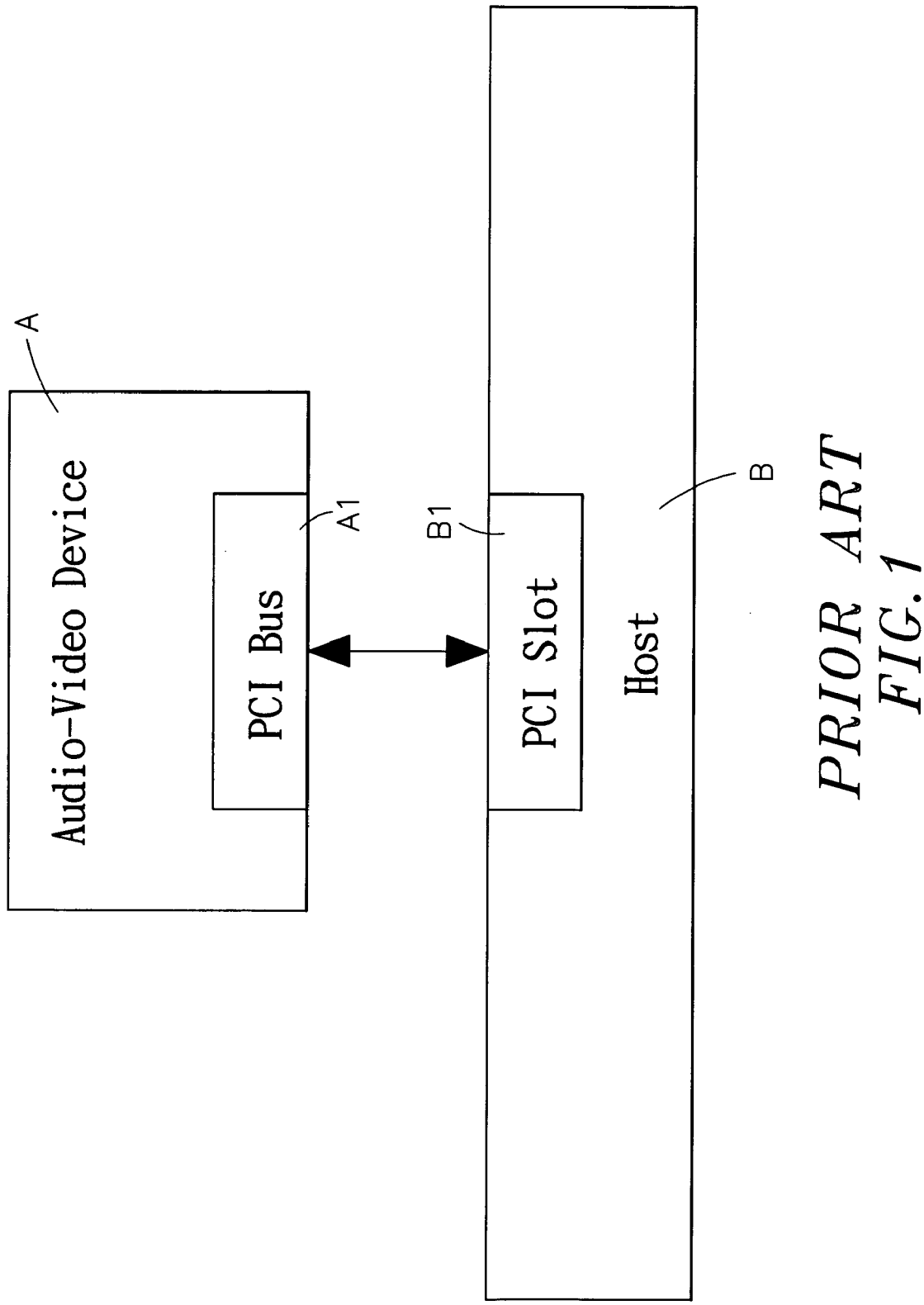
FIG. 1 is a block diagram illustrating a conventional method of testing an audio-video device.
Figure 2:
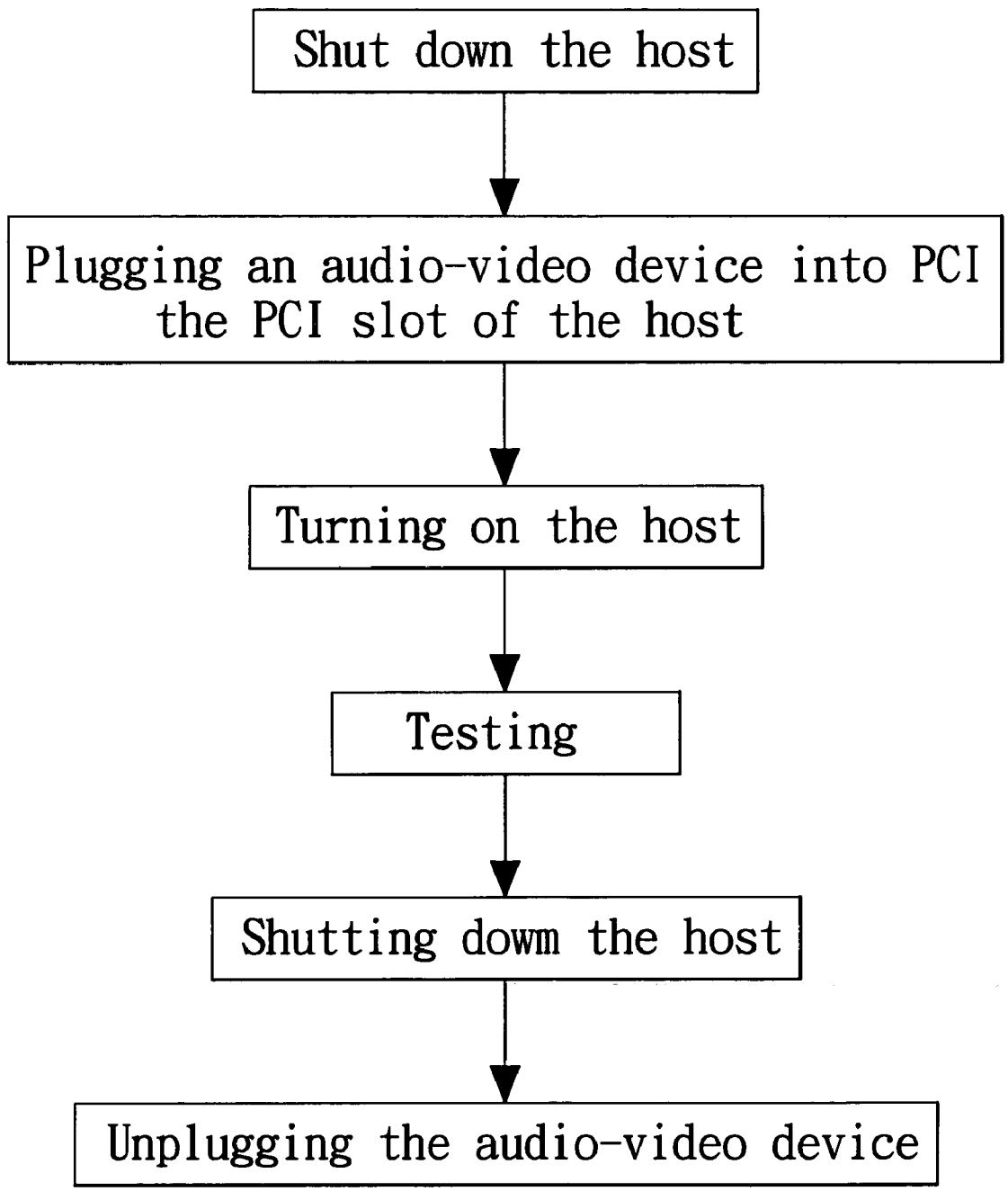
FIG. 2 is a flowchart of a conventional testing method.

Reference will be made in detail to the preferred embodiments of the invention, examples of which are illustrated in the accompanying drawings. Wherever possible, the same reference numbers are used in the drawings and the description to refer to the same or like parts.

Referring to FIGS. 3~5W, a test interface card 1 in accordance with the present invention is shown comprising a microcontroller 11, a PCI Bus 12, a Bus power control circuit 13, a PCI slot 14 and a switch 15. The PCI Bus 12, the Bus power control circuit 13 and the PCI slot 14 are respectively electrically connected to the microcontroller 11. The Bus power control circuit 13 is also connected to the switch 15.

The microcontroller 11 is adopted for sensing a status of the Bus power control circuit 13 and transmitting the sensing result to a test host 2.

The PCI Bus 12 may be connected to a PCI slot 21 of the test host 2, and the PCI Bus 12 cam obtain power from the test host 2 through the PCI slot 21 for running the test interface card 1.

The Bus power control circuit 13 may be adopted for controlling the power supply to the PCI slot 14.

The PCI slot 14 may be adapted for implementing the testing of an audio-video device 3.

The switch 15 may allow a user to control and to emit a switch signal to the USB power control circuit 13.

Figure 3:
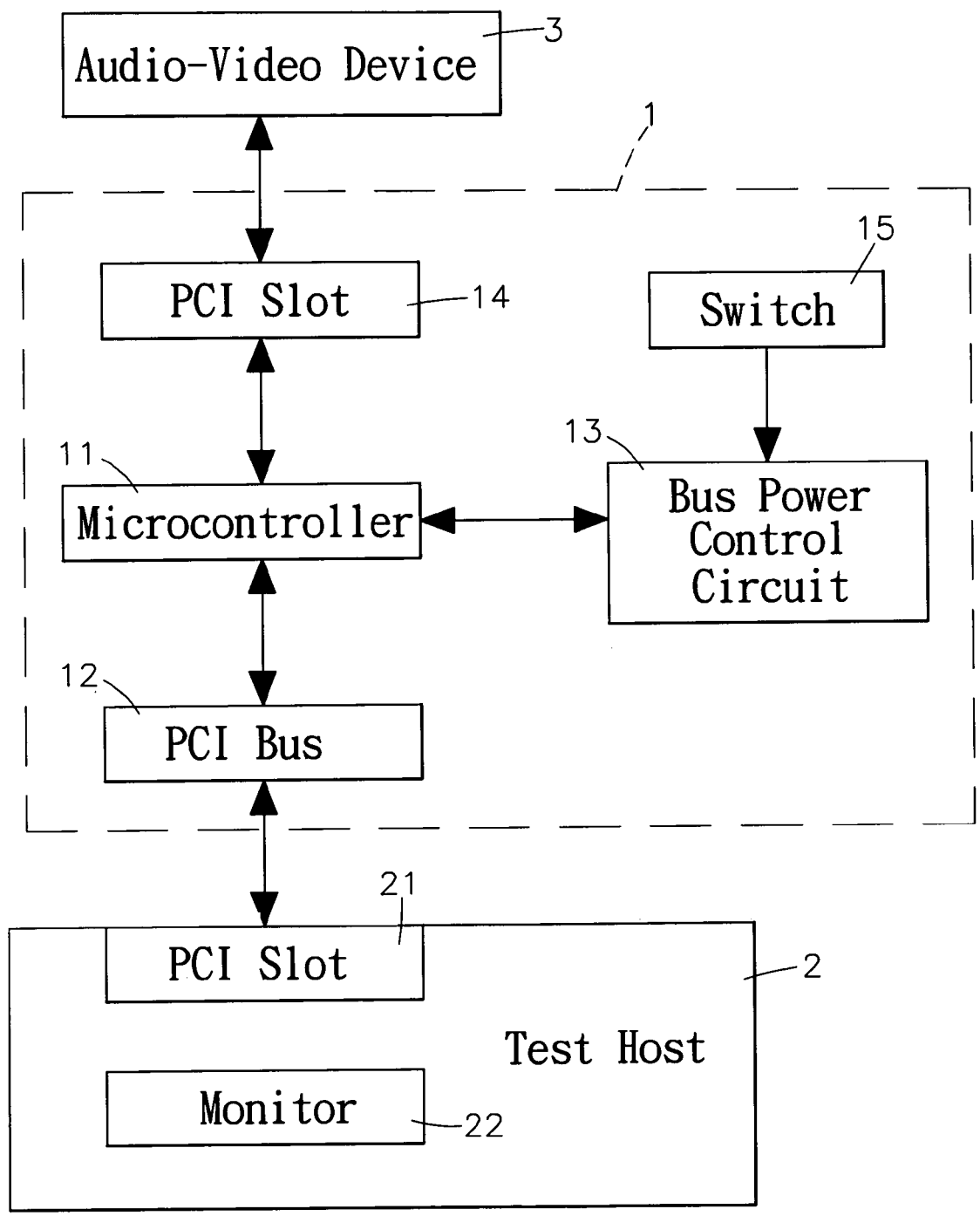
FIG. 3 is a block diagram illustrating a testing method according to a preferred embodiment of the present invention.
Figure 4A:
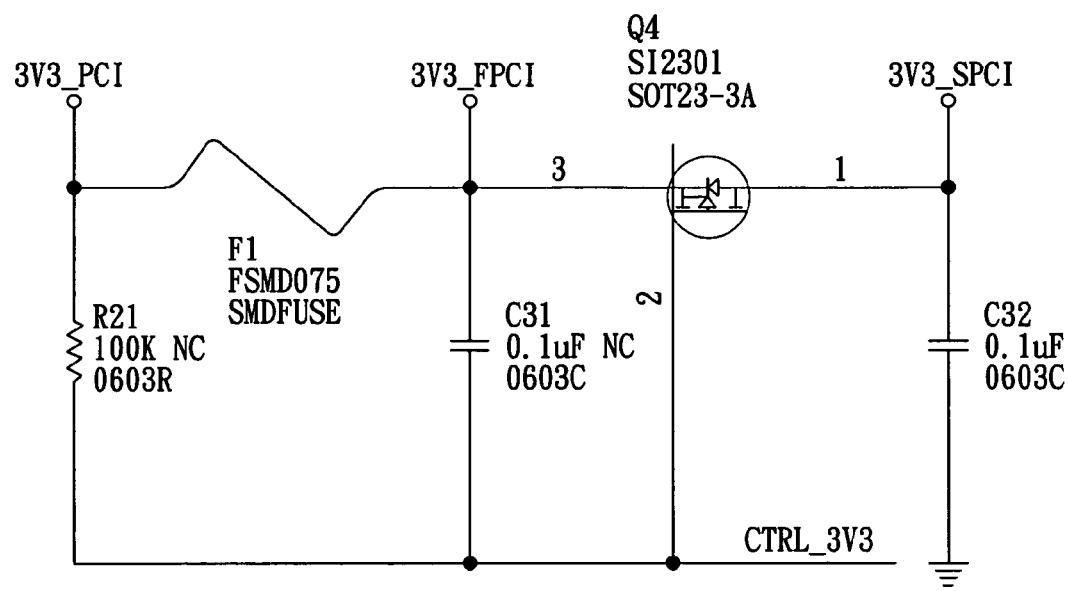
FIGS. 4A~4W are circuit diagrams of a microcontroller and a PCI slot according to the present invention.
Figure 4B:
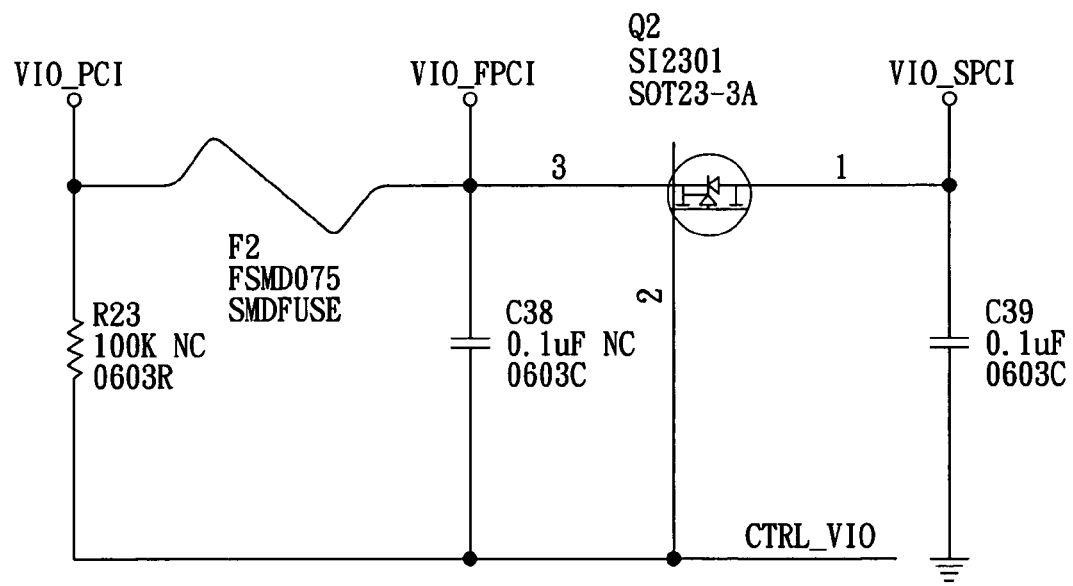
Figure 4C:
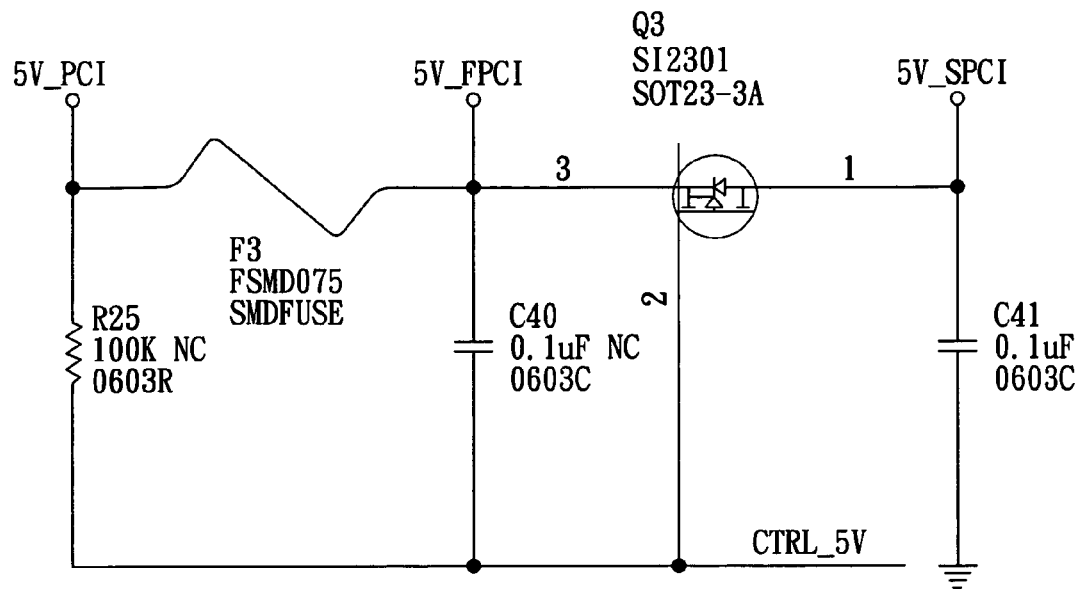
Figure 4D:
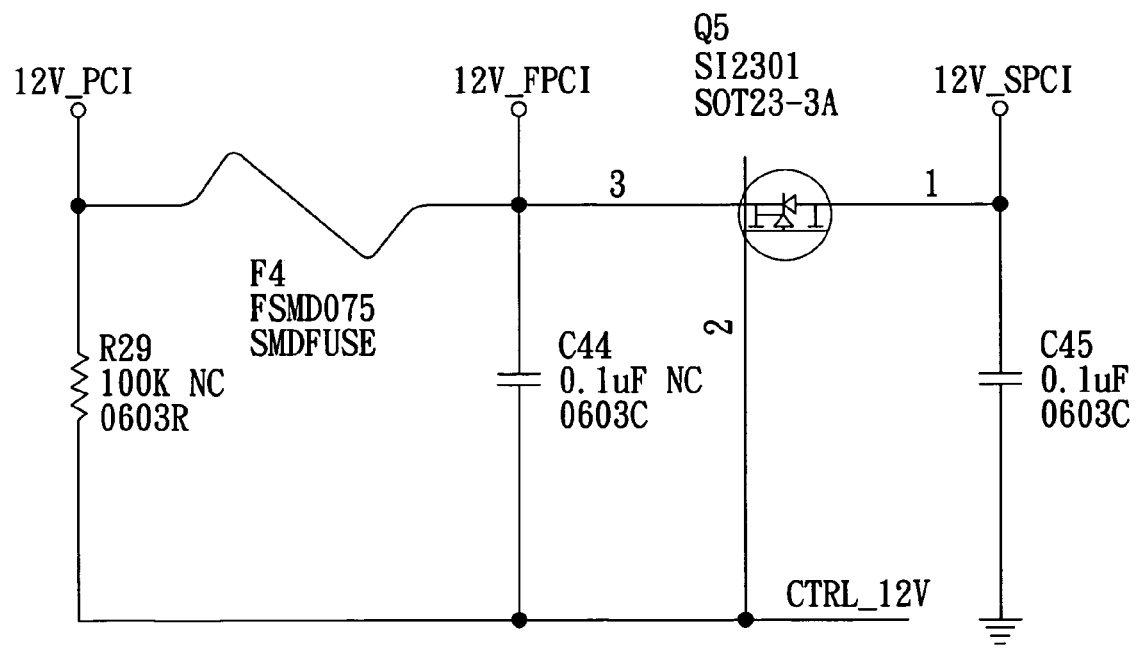
Figure 4E:
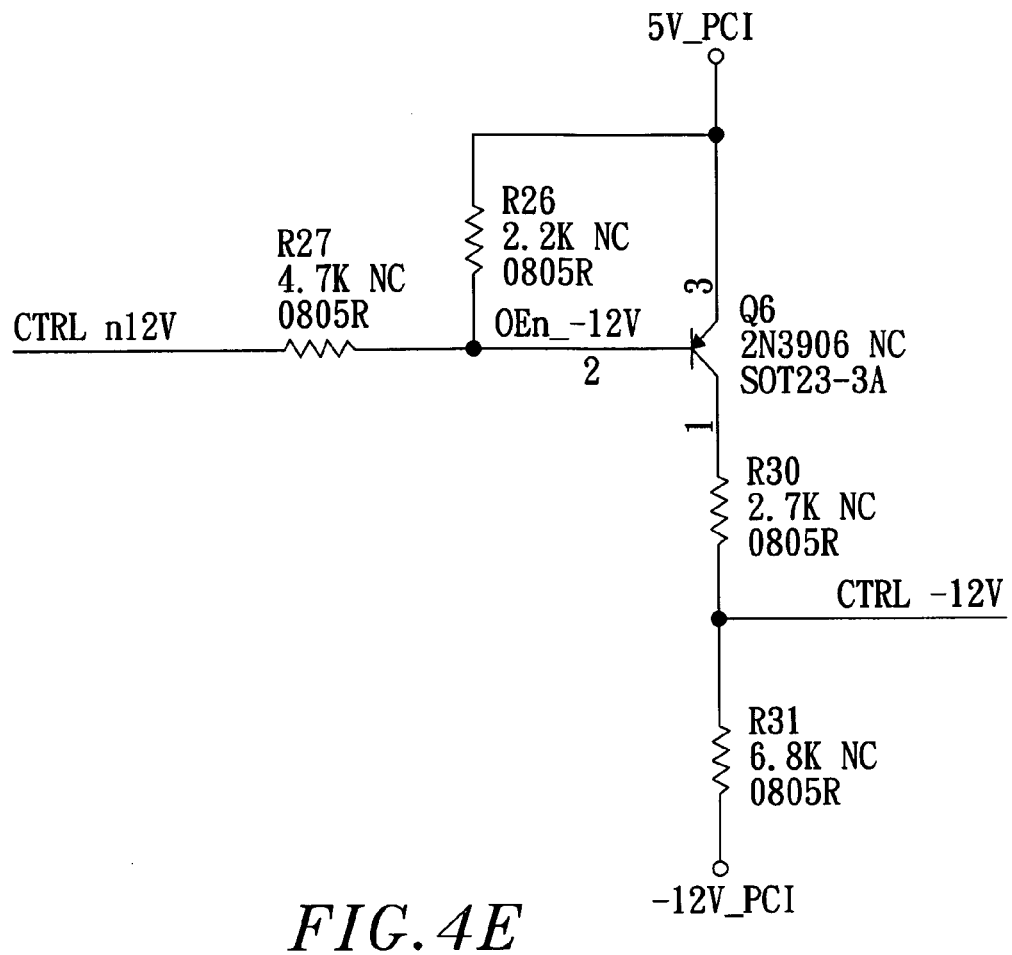
Figure 4F:
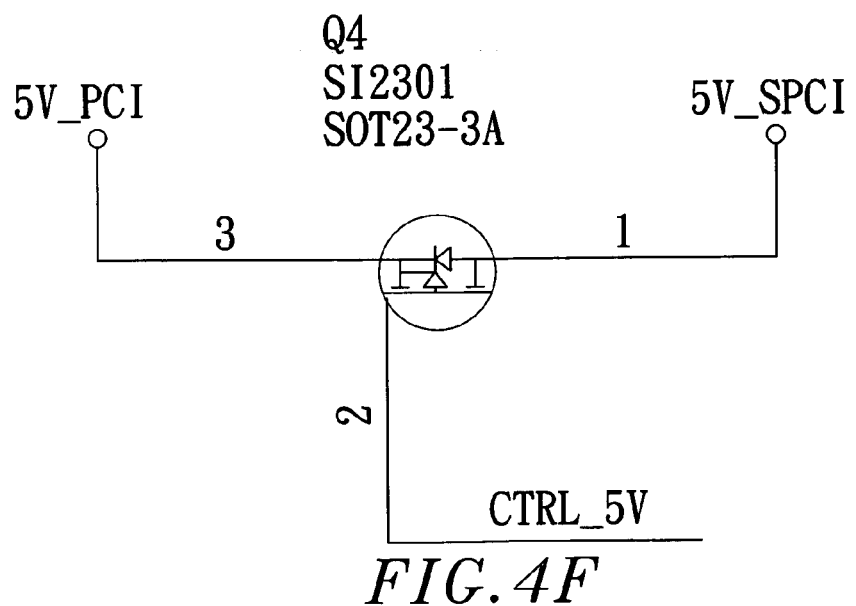
Figure 4G:
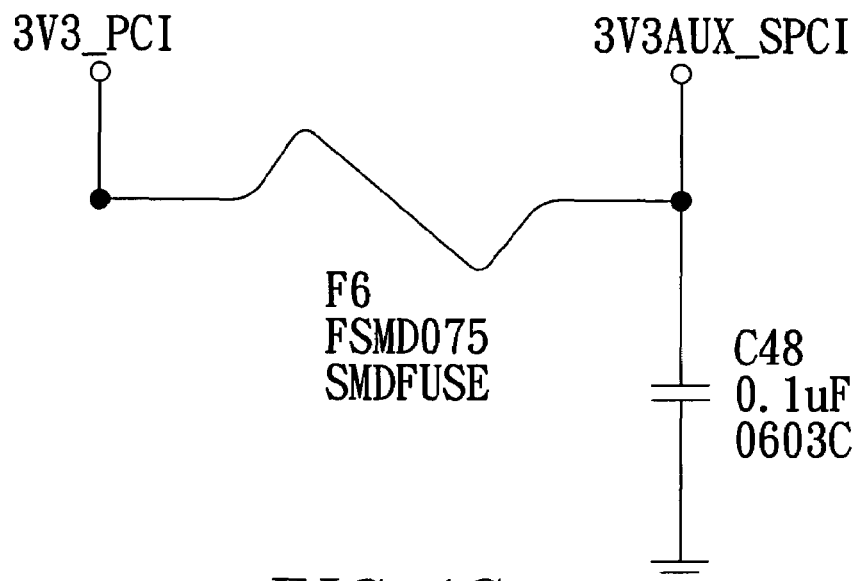
Figure 4H:
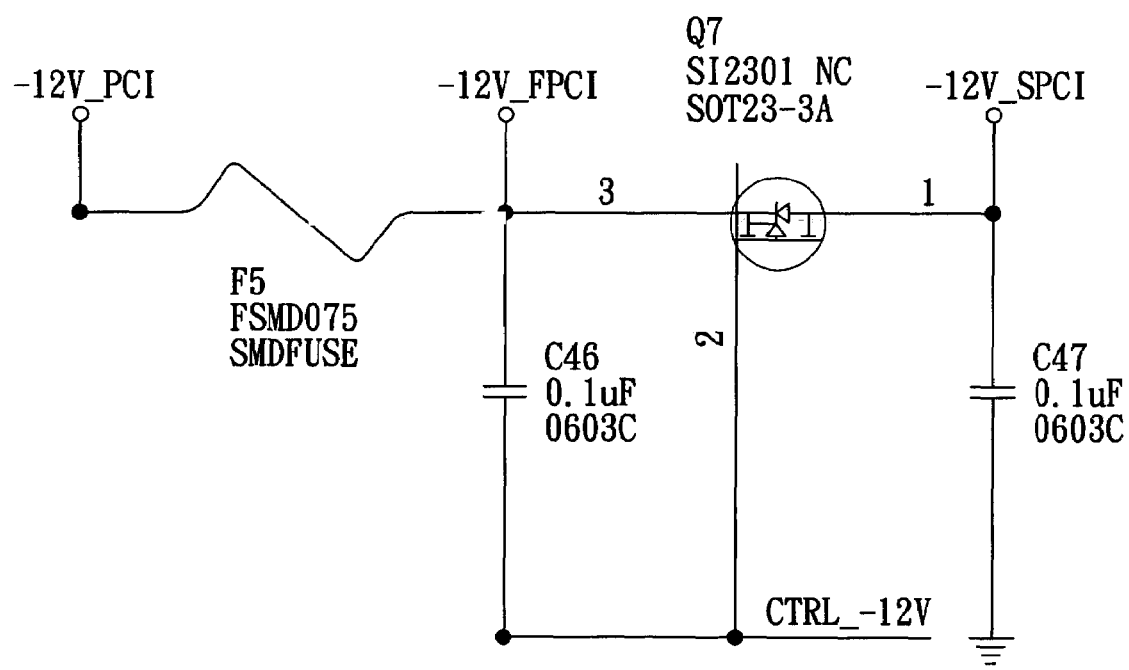
Figure 4I:
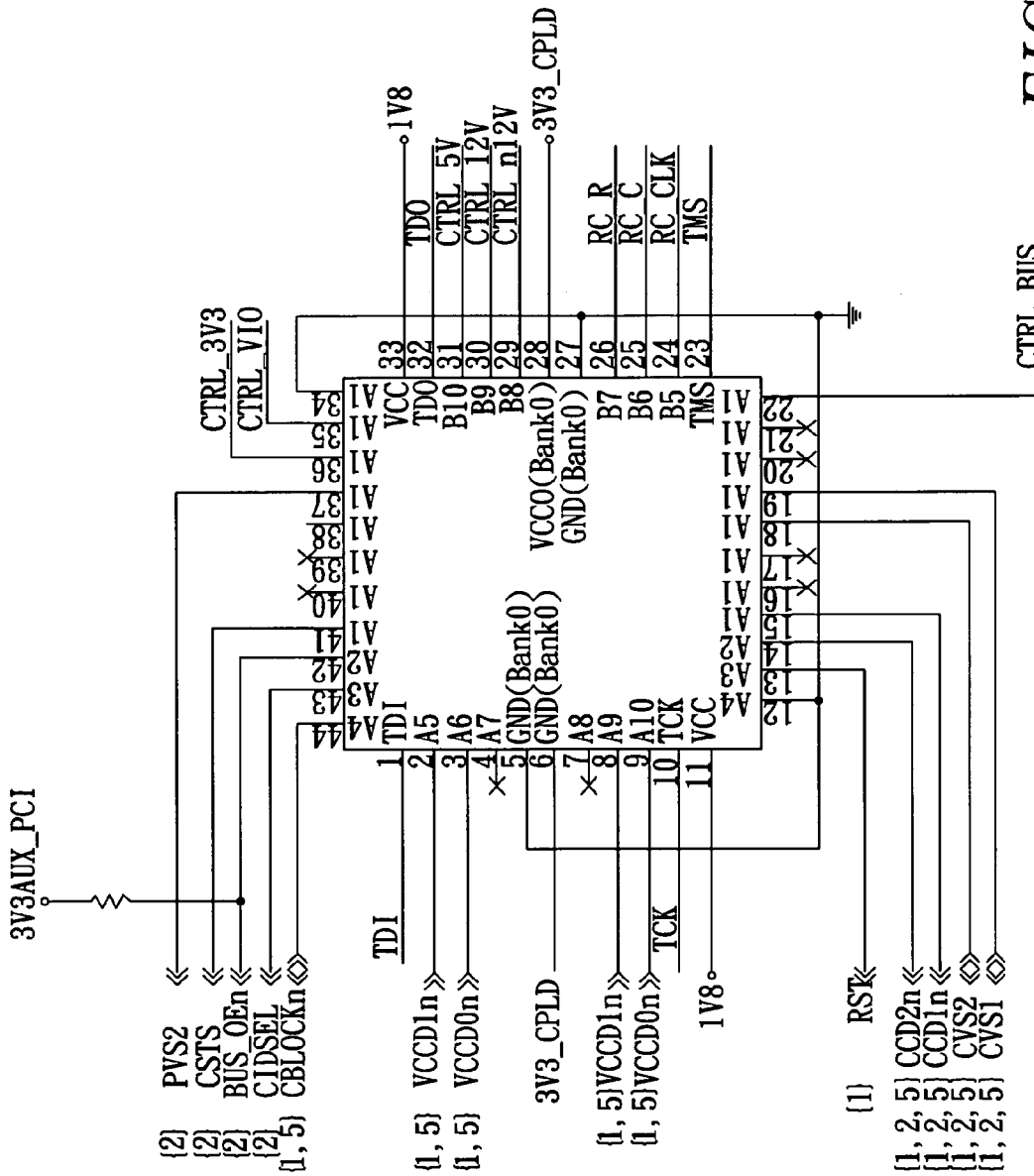
Figure 4L:
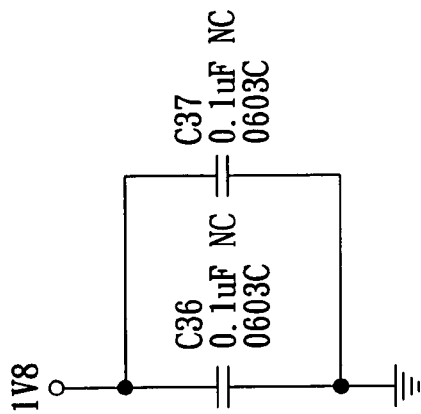
Figure 4J:
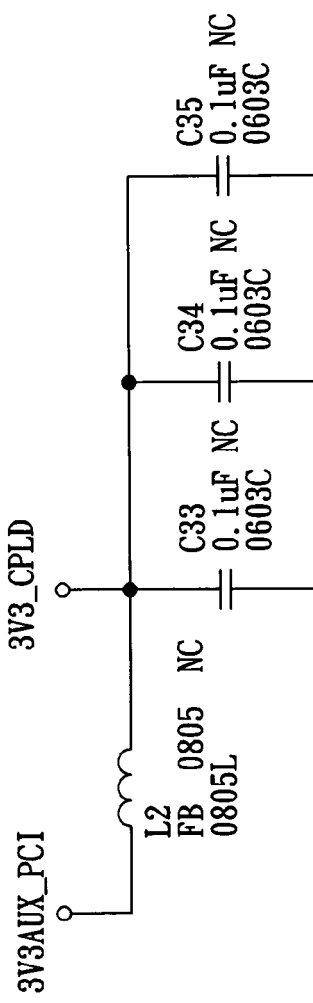
Figure 4K:
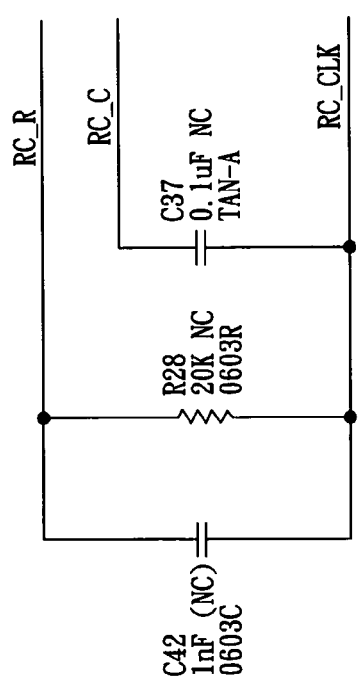
Figure 40:
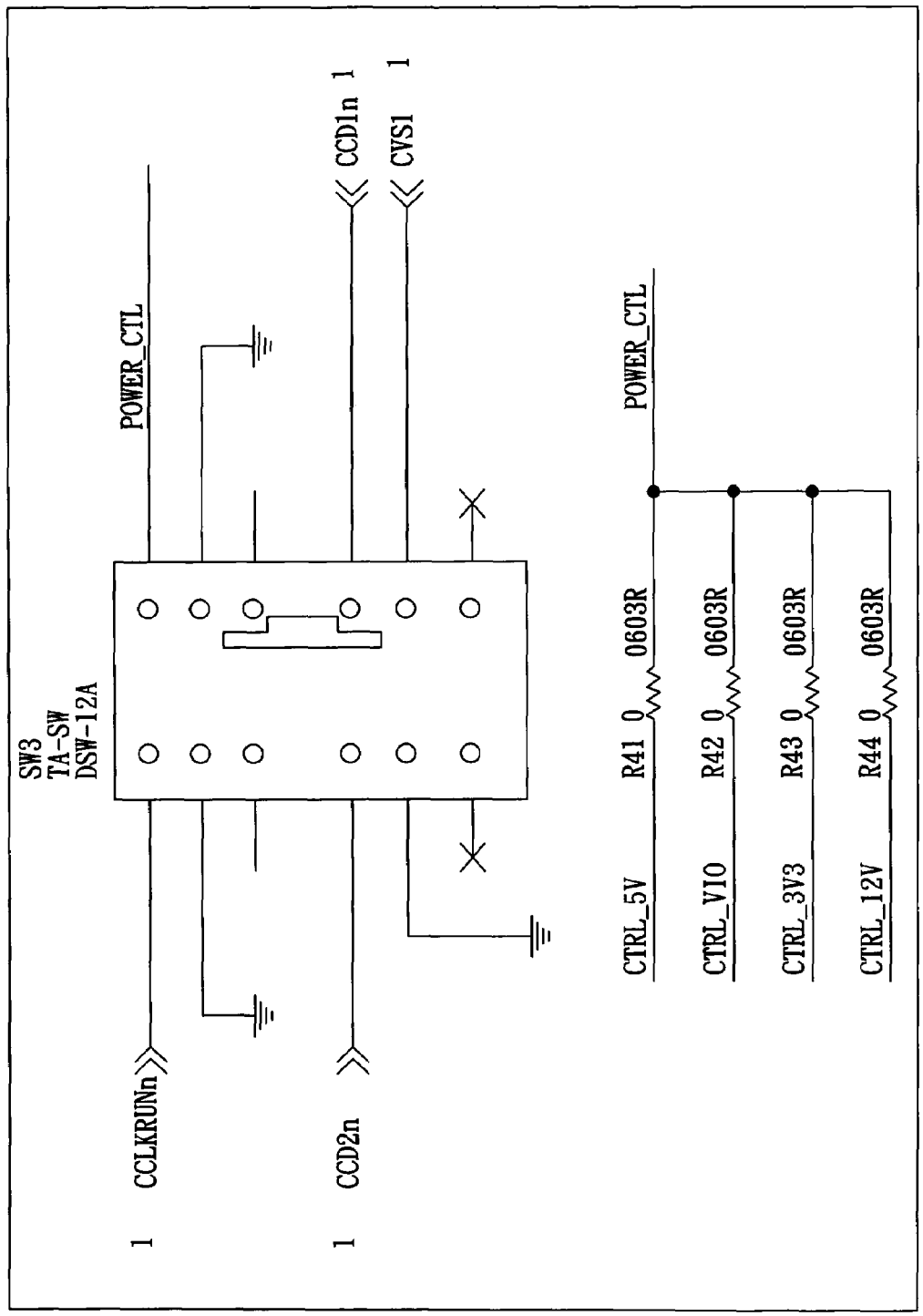
Figure 4V:
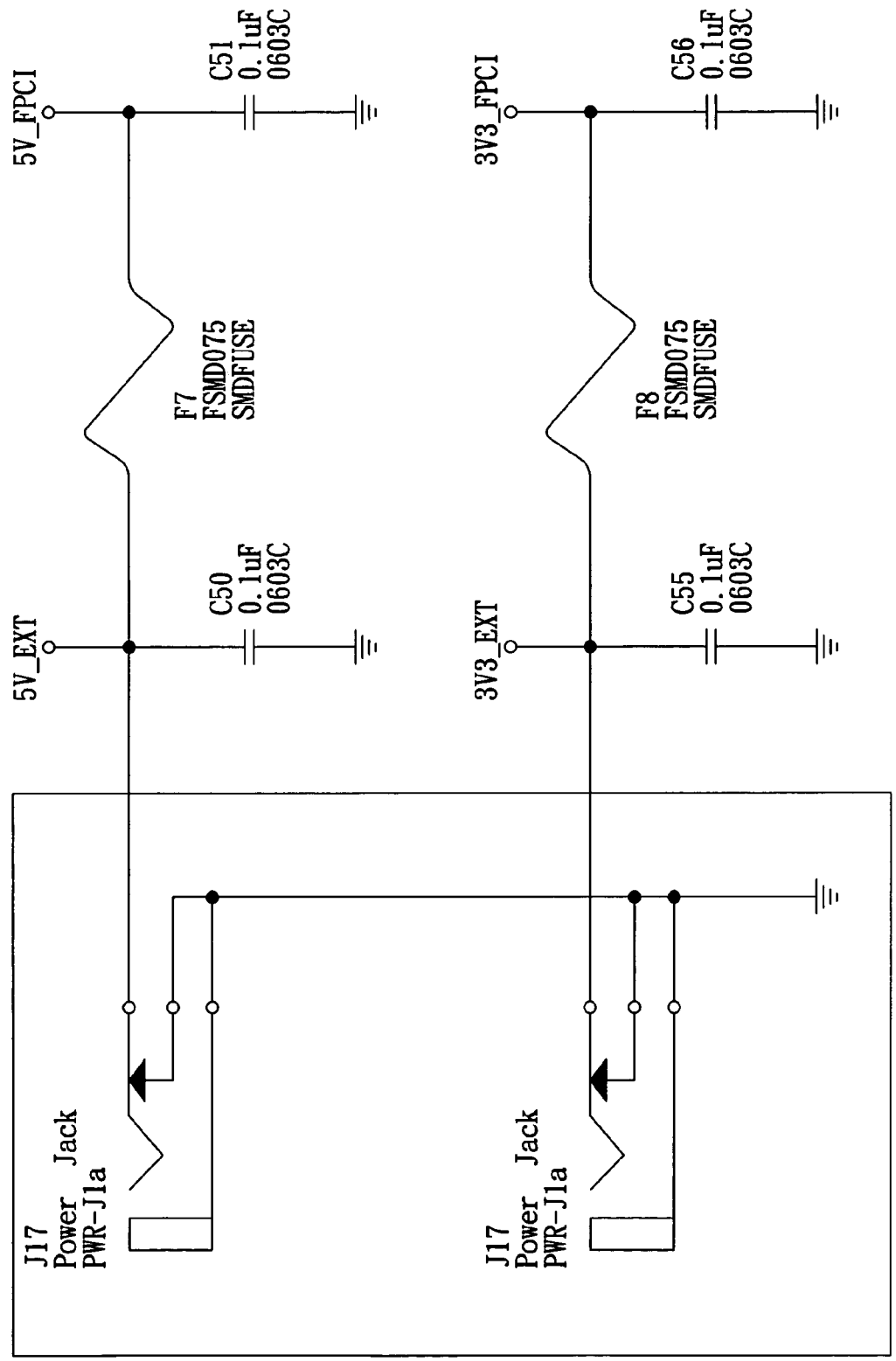
Figure 4W:
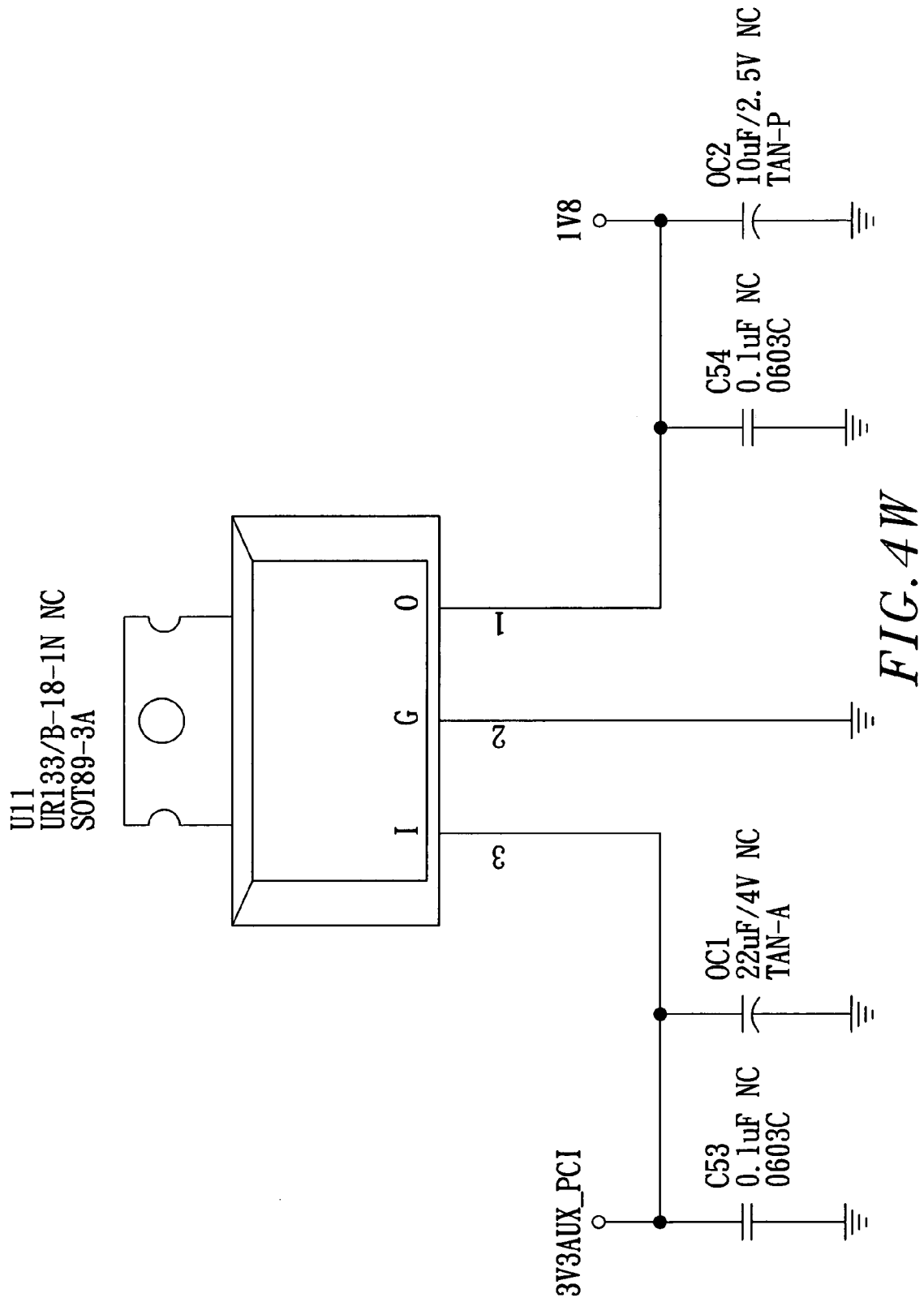
Figure 5A:
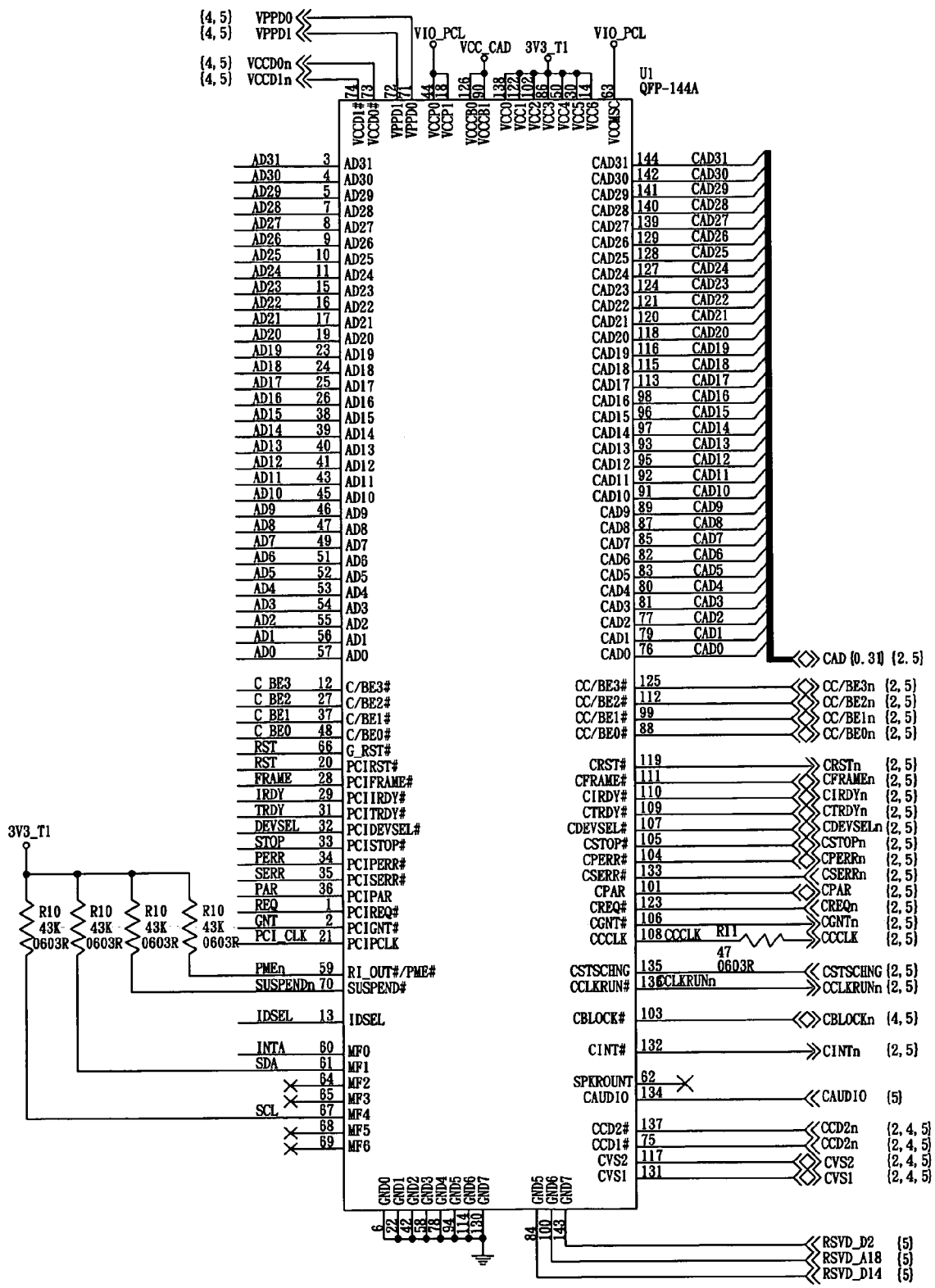
FIG. 5 is a circuit diagram of a Bus power control circuit according to the present invention.
FIGS. 5B and 5C together form FIG. 5.
FIGS. 5E~5Q are circuit diagrams of a Bus power control circuit according to the present invention.
FIG. 5R is a circuit diagram of a Bus power control circuit according to the present invention.
FIGS. 5S, 5T, 5U and 5V together form FIG. 5R.
FIG. 5W is a diagram showing how FIGS. 5S, 5T, 5U and 5V mate together.
Figure 5B:
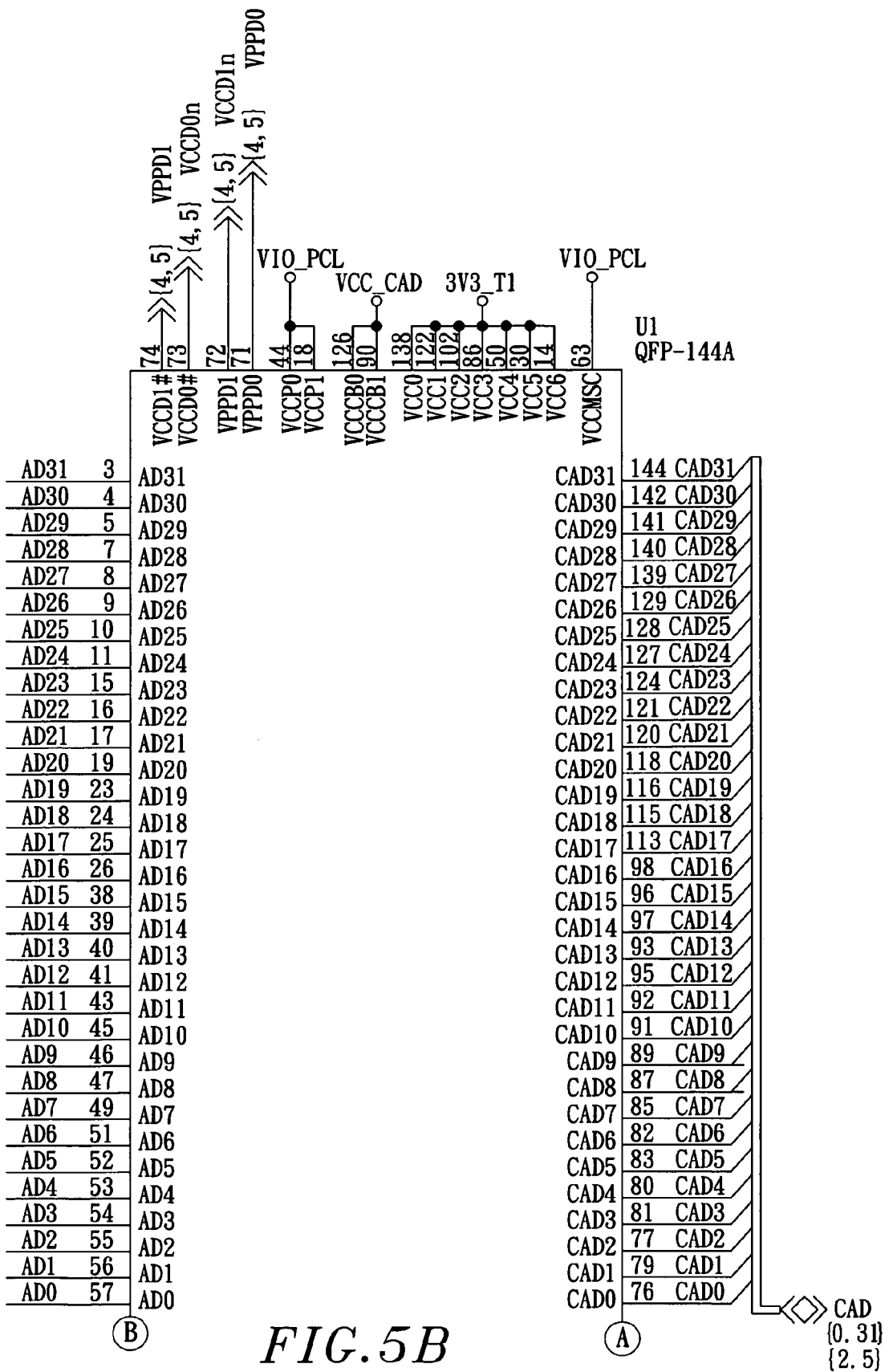
Figure 5C:
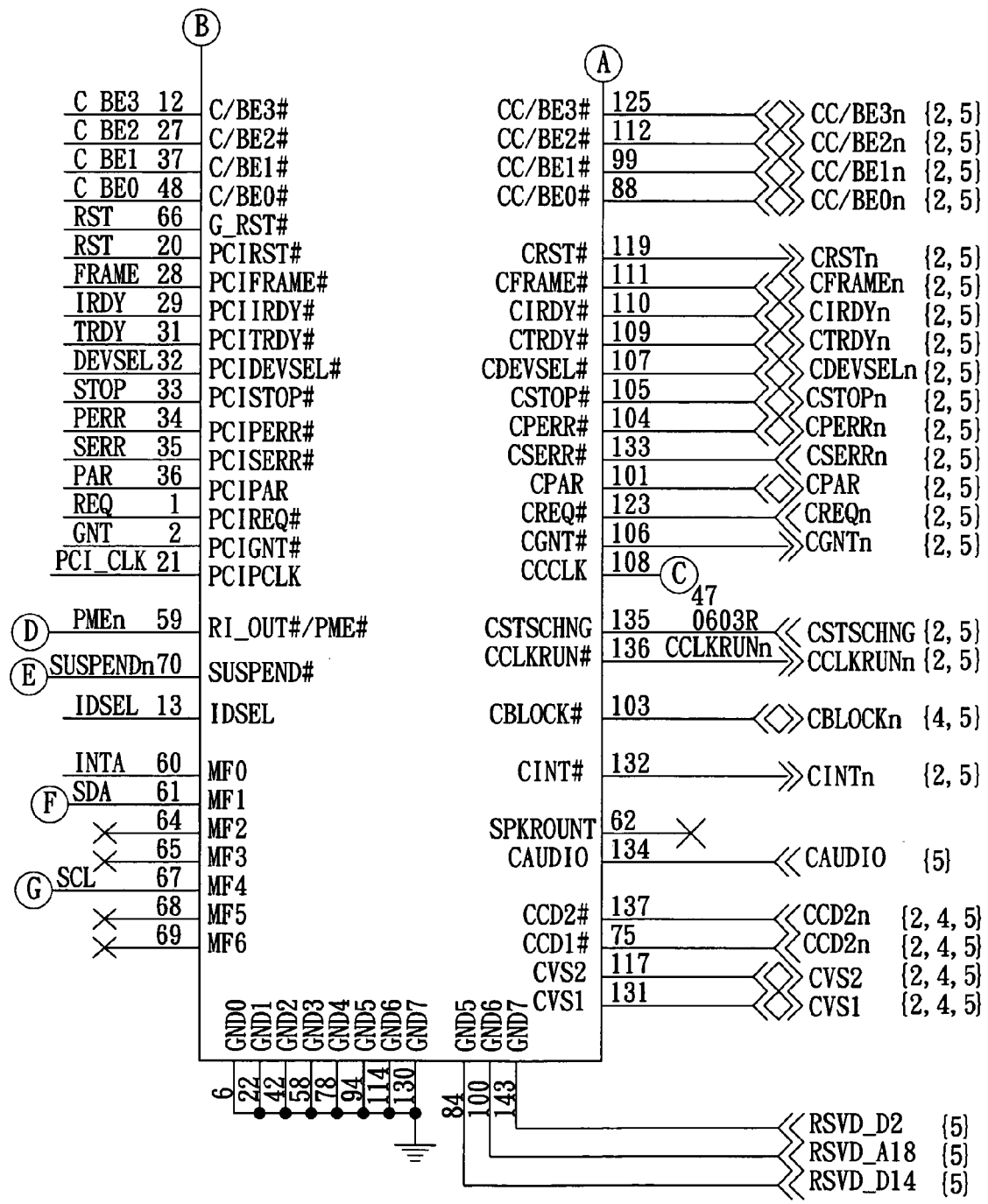
Figure 5F:
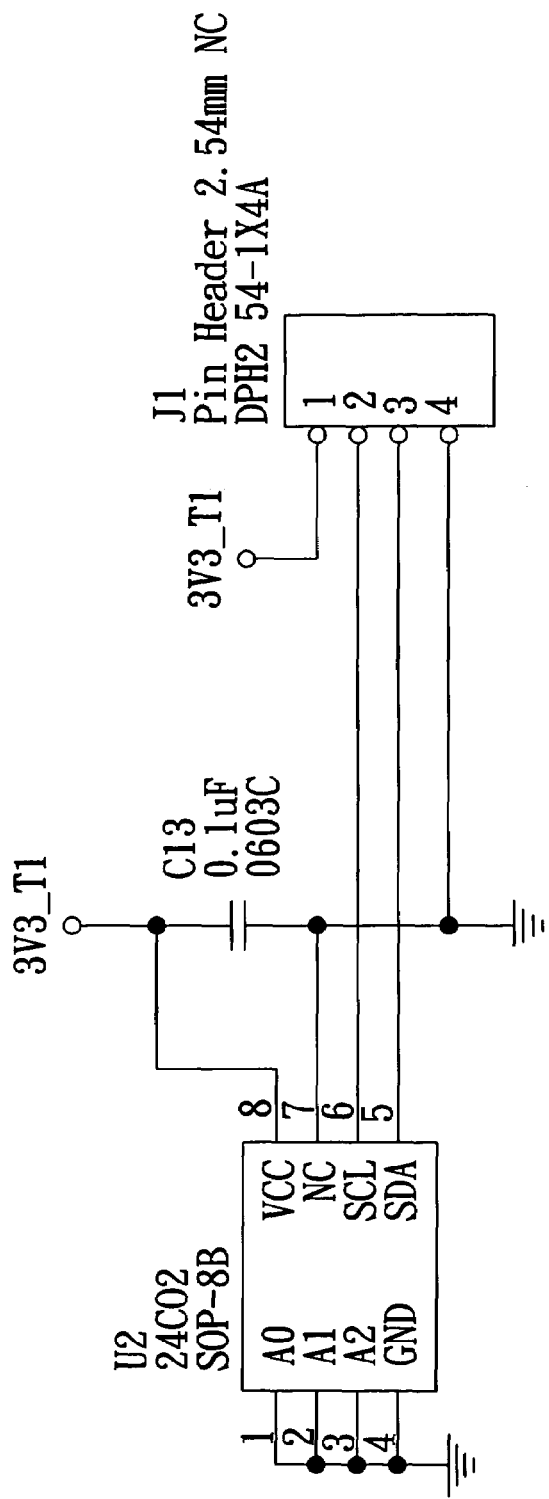
Figure 5G:
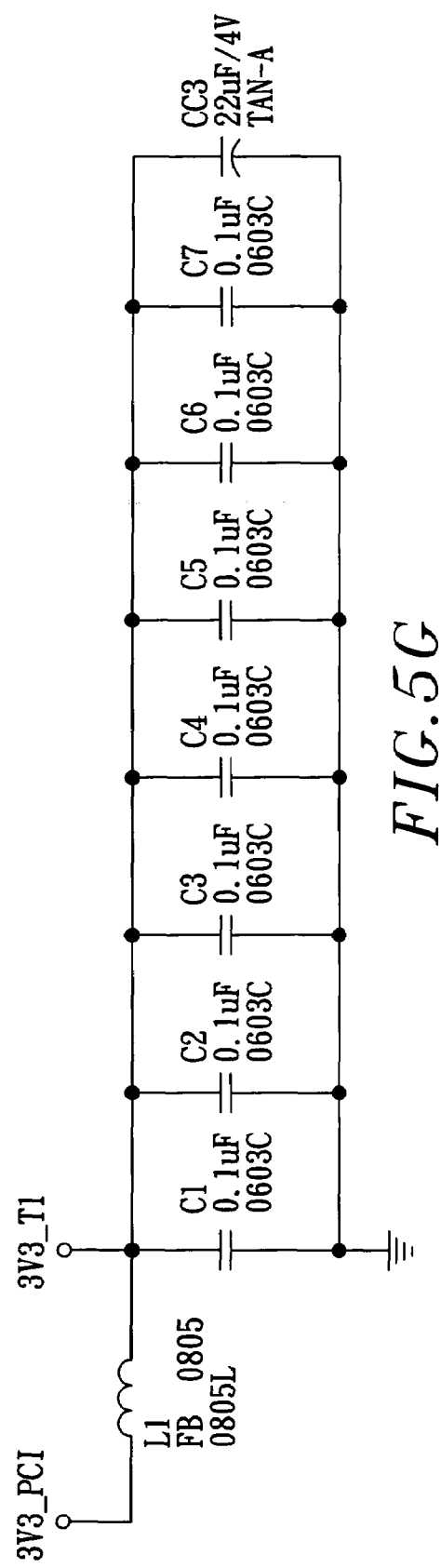
Figure 5H:
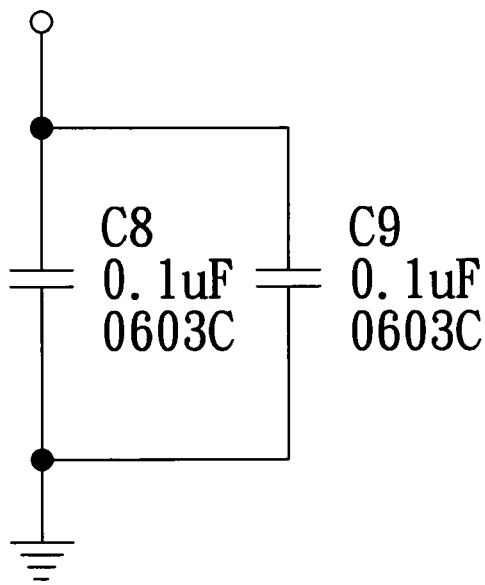
Figure 5I:
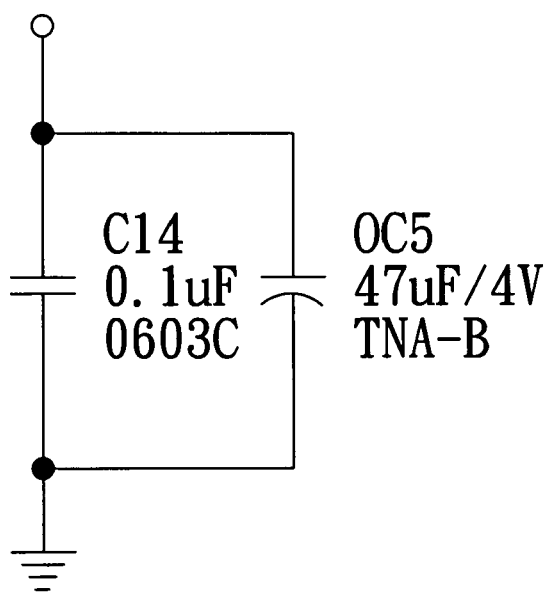
Figure 5J:
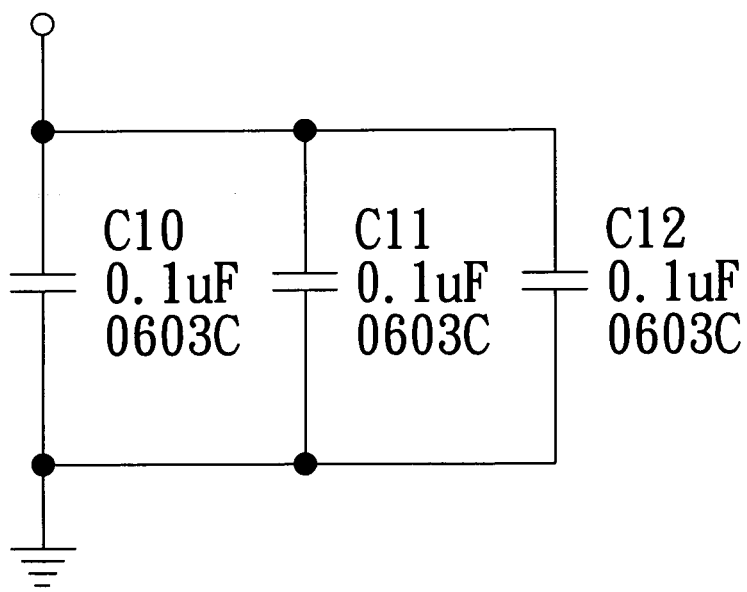
Figure 5K:
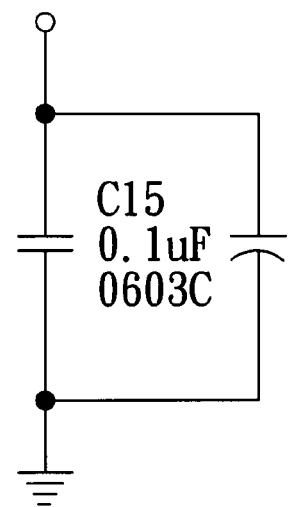
Figure 5L:
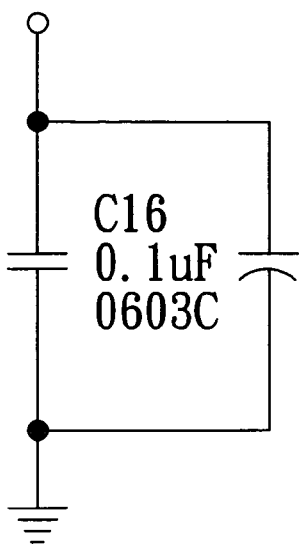
Figure 5M:
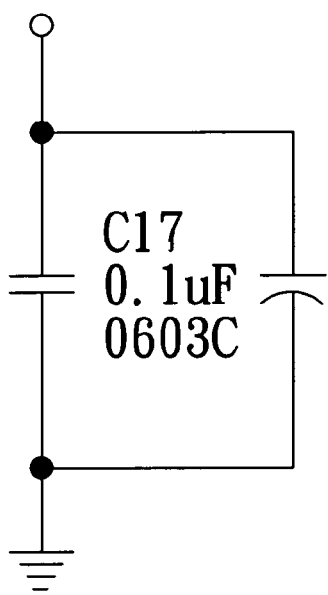
Figure 5N:
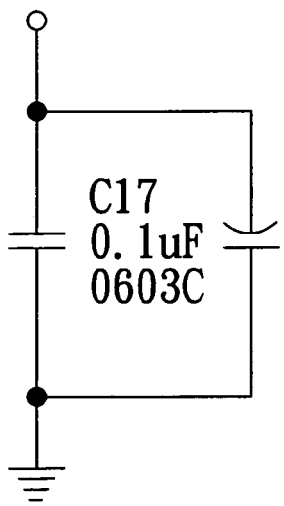
Figure 5O:
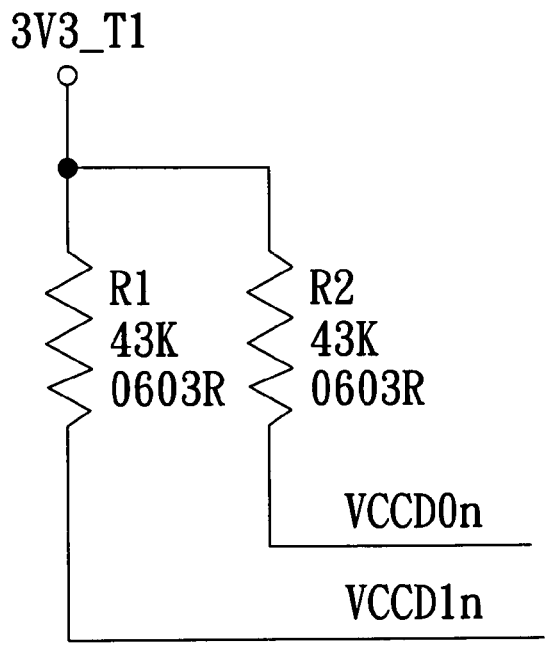
Figure 5P:
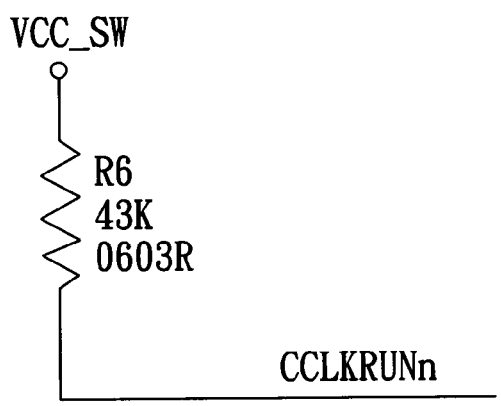
Figure 5Q:
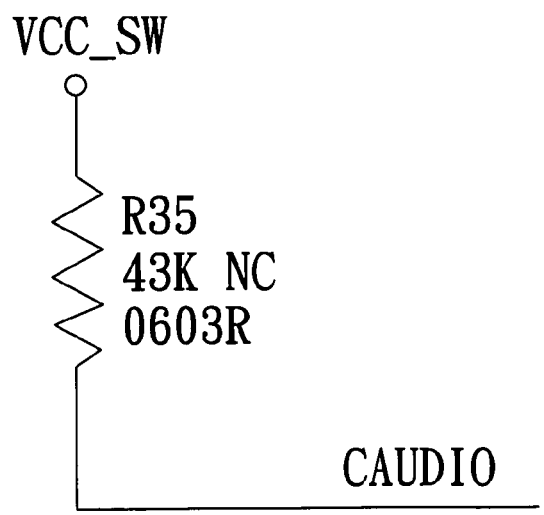
Figure 5R:
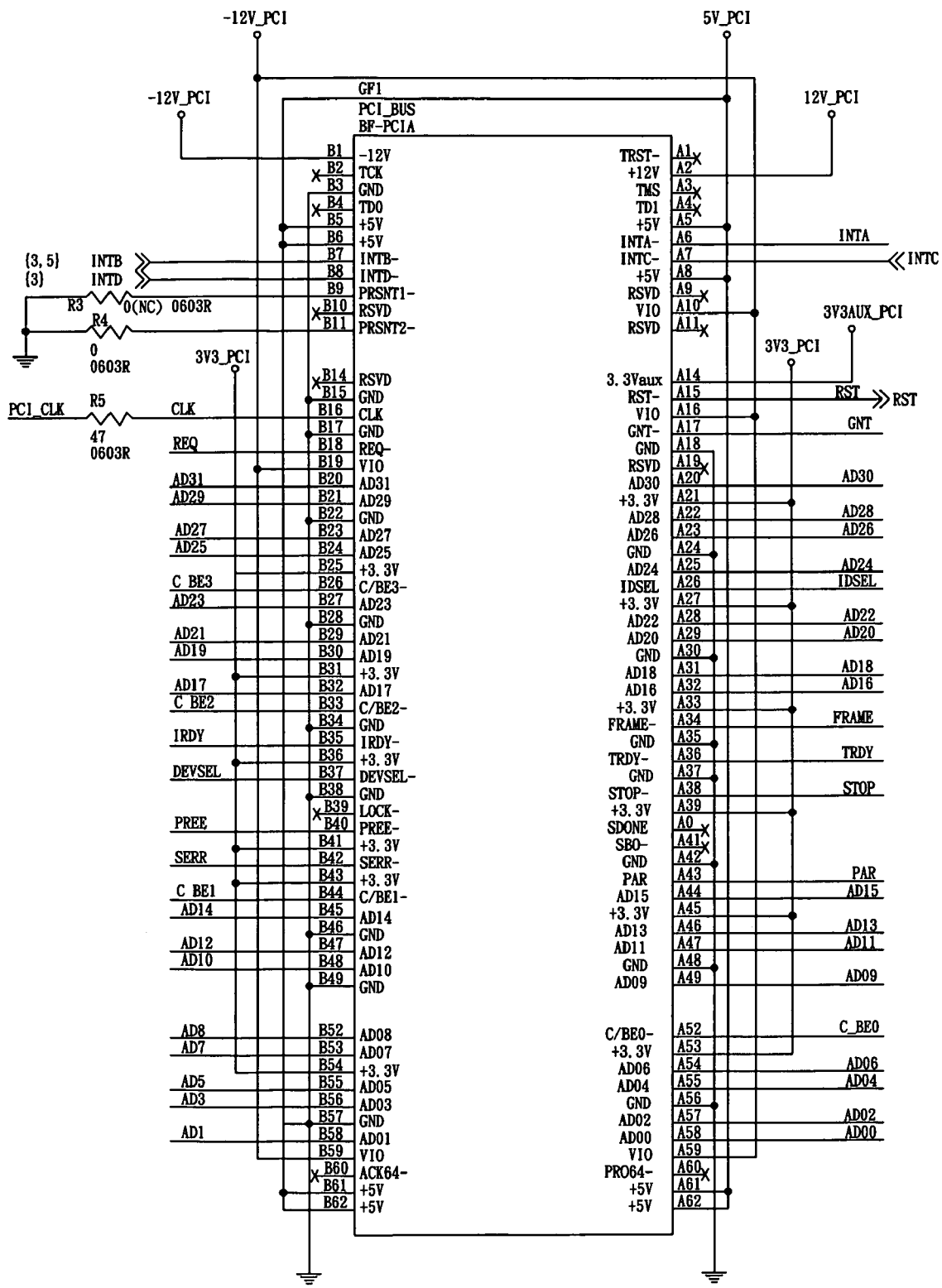
Figure 5S:
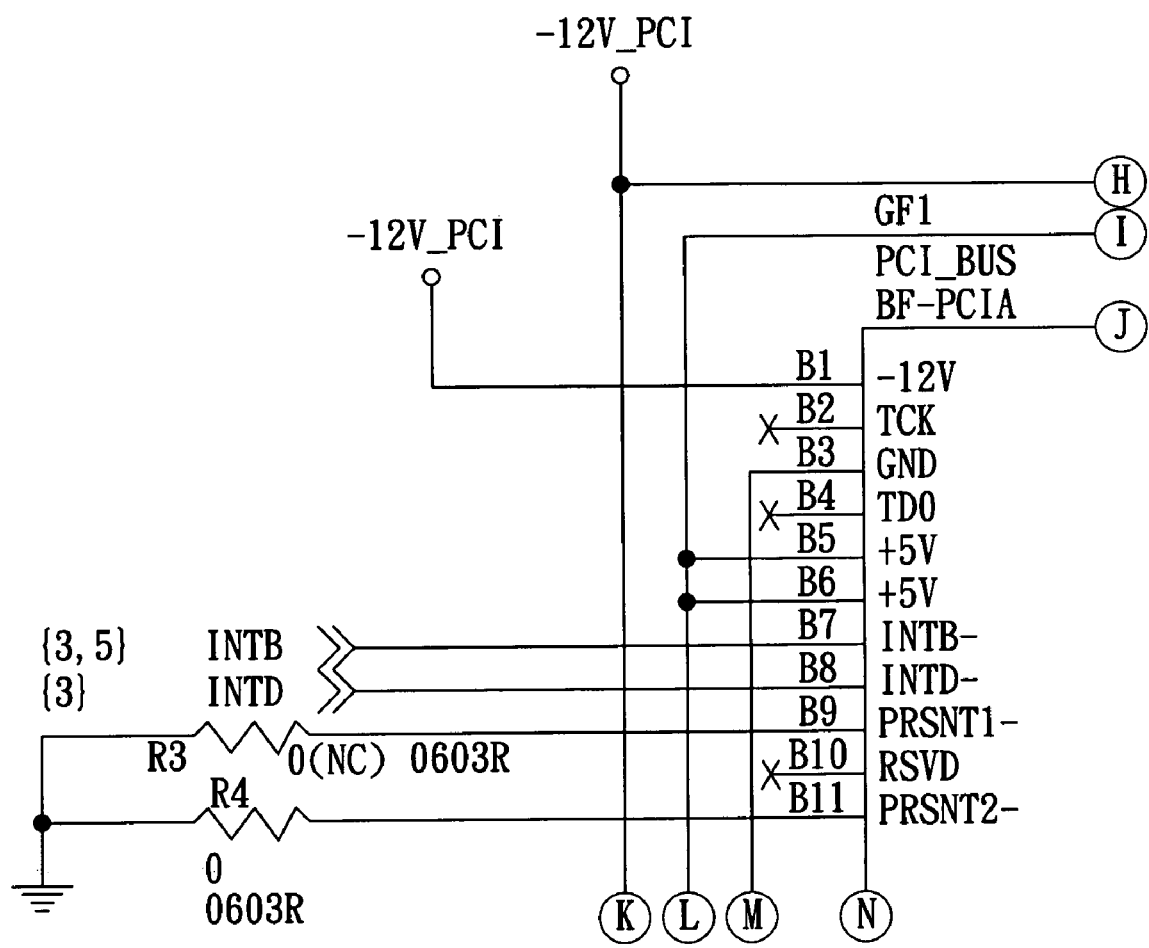
Figure 5T:
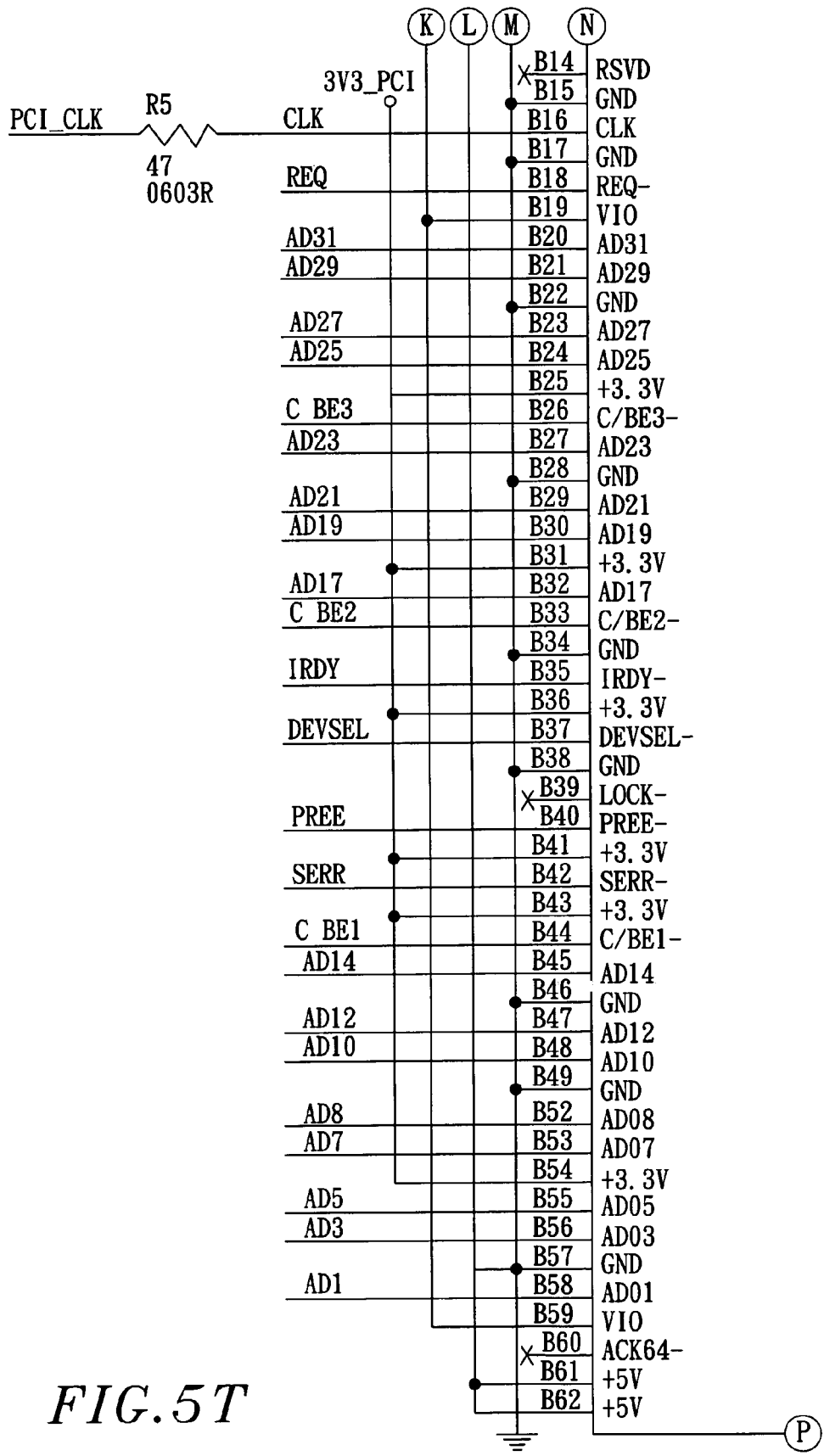
Figure 5U:
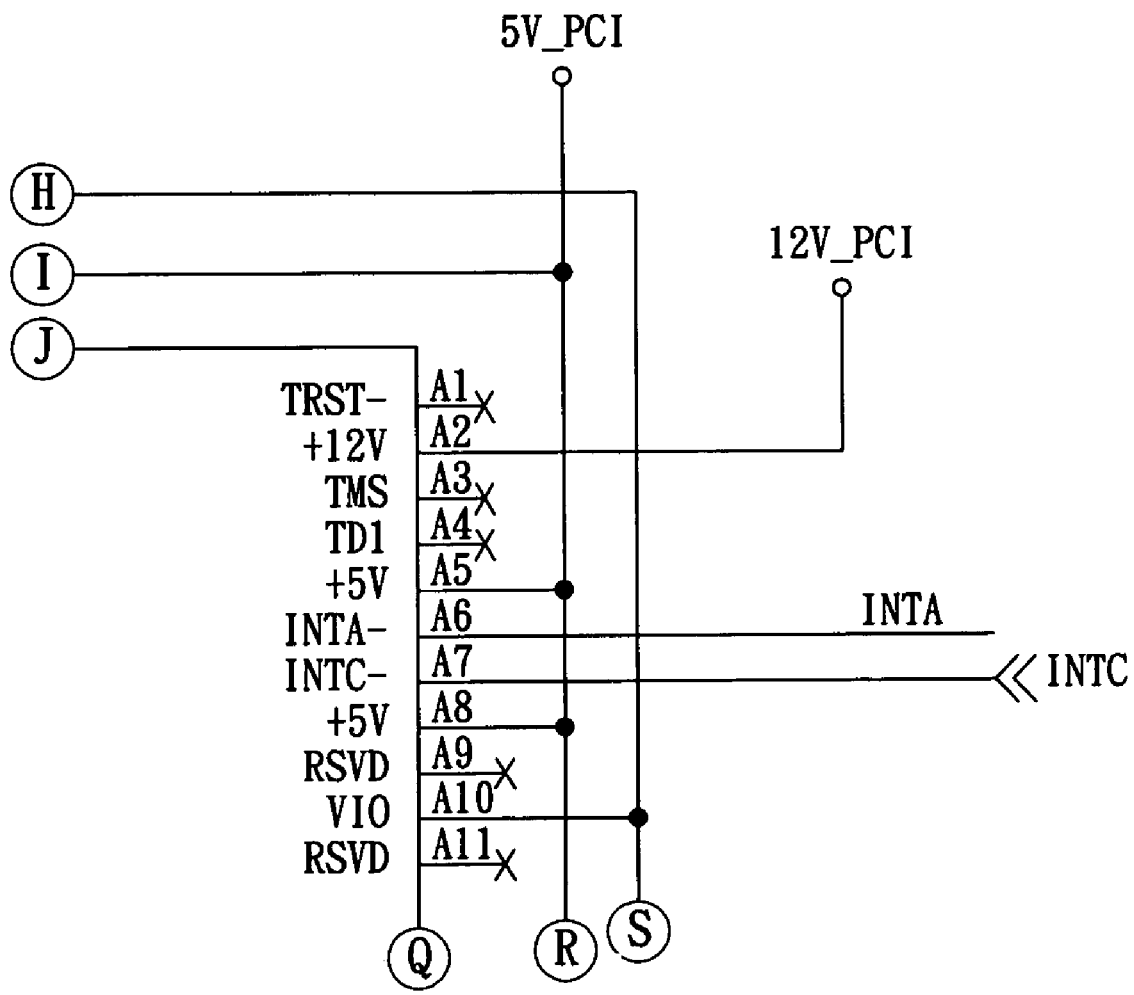
Figure 5V:
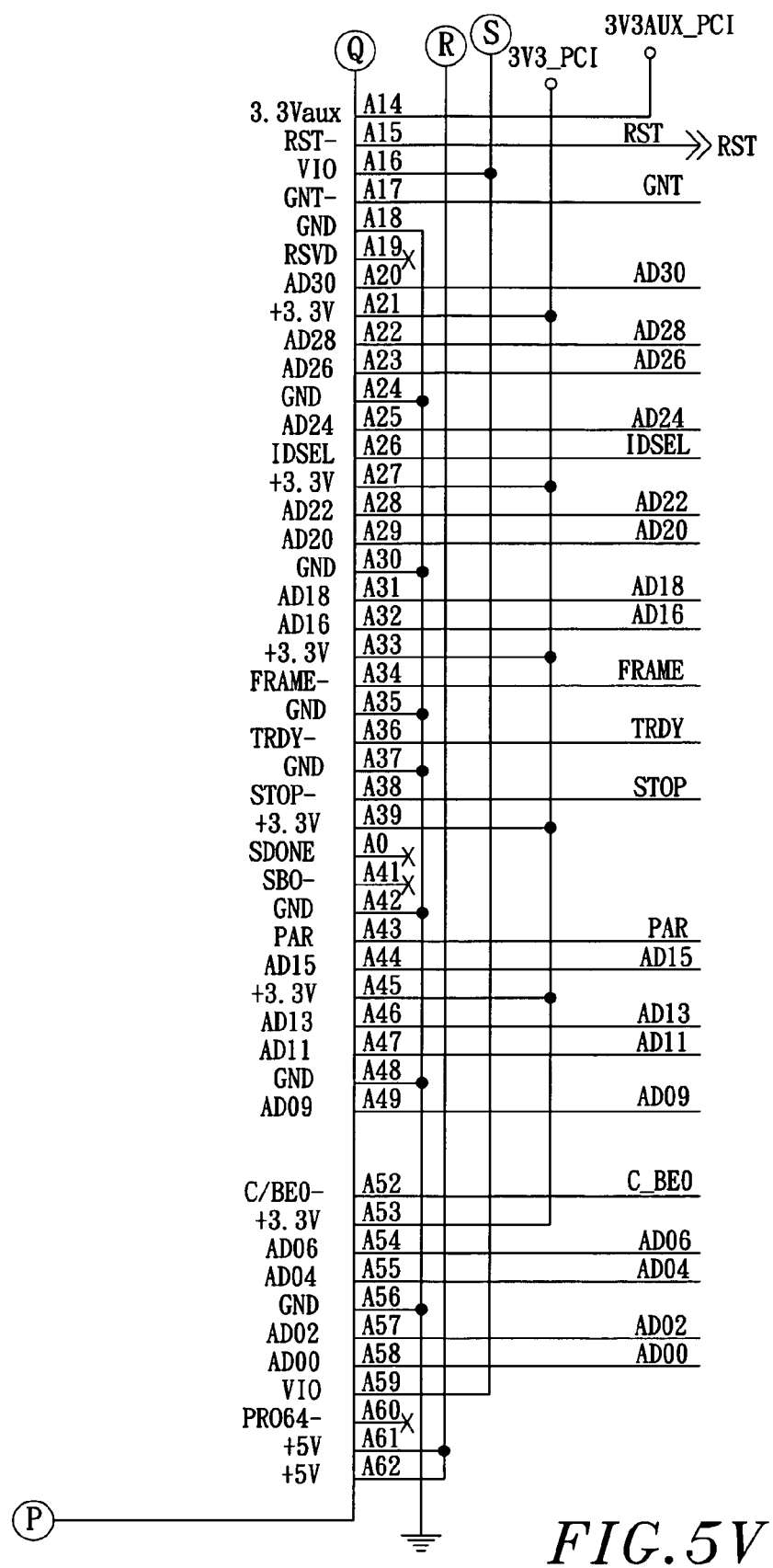
Figure 5W:
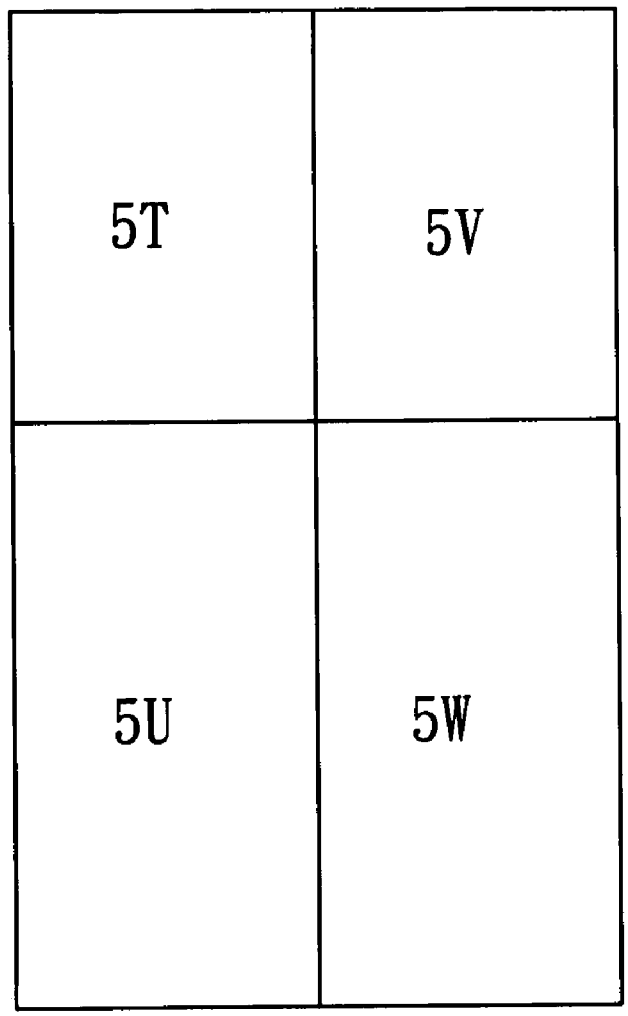
Figure 6:
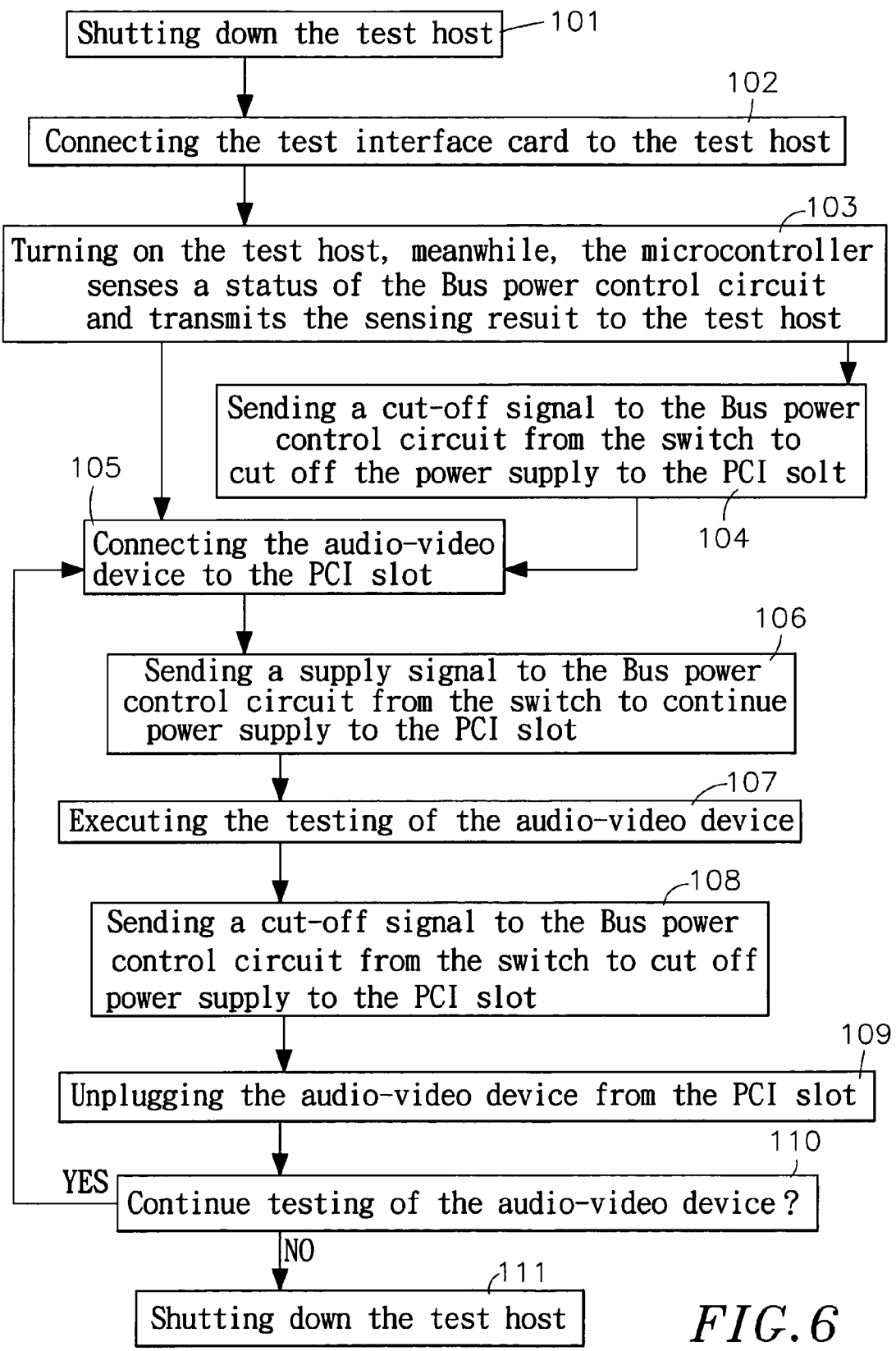
FIG. 6 is a flowchart illustrating a testing method according to a preferred embodiment of the present invention.

Referring to FIGS. 3 and 6, the testing procedure according a preferred embodiment of the present invention is described as follows.

At step 101, the test host 2 without hot plug function is shut down.

At step 102, the PCI Bus 12 of the test interface card 1 is connected to the PCI slot 21 of the test host 2.

At step 103, the test host 2 is turned on, meanwhile, the test interface card 1 gains power from the test host 2, and the microcontroller 111 begins to sense a status of the Bus power control circuit 13 and transmits the sensing result to the test host 2. The test host 2 displays the sensing result on a monitor 22, wherein if the sensing result displayed on the monitor 22 is supplying power, then the procedure proceeds to step 104, otherwise the procedure proceeds to step 105.

At step 104, a cut-off signal may be emitted to the Bus power control circuit 13 from the switch 15 to cut off the power supply to the PCI slot 14.

At step 105, the audio-video device 3 is connected to the PCI slot 14.

At step 106, a supply signal may be emitted to the Bus power control circuit 13 from switch 15 to continue power supply to the PCI slot 14.

At step 107, the testing is executed on the audio-video device 3.

At step 108, a cut-off signal may be emitted to the Bus power control circuit 13 from the switch 15 to cut off power supply to the PCI slot 14.

At step 109, the audio-video device 3 may be unplugged from the PCI slot 14.

At step 110, whether or not to continue testing of another audio-video device 3 is judged, if yes, the procedure proceeds step 105, otherwise the procedure proceeds to step 111.

At step 111, power to the test host 2 is shut down.

According to the description above, a plurality of the audio-video device 3 may be tested without shutting down the test host 2 by using the Bus power control circuit 13 and the switch 15 for selectively cutting off or supplying power to the PCI slot 14. Thus, the time and the cost of testing can be substantially reduced.

Furthermore, the switch 15 may be a photoelectric switch, a touch-tone switch or a twisting switch.

Figure 7:
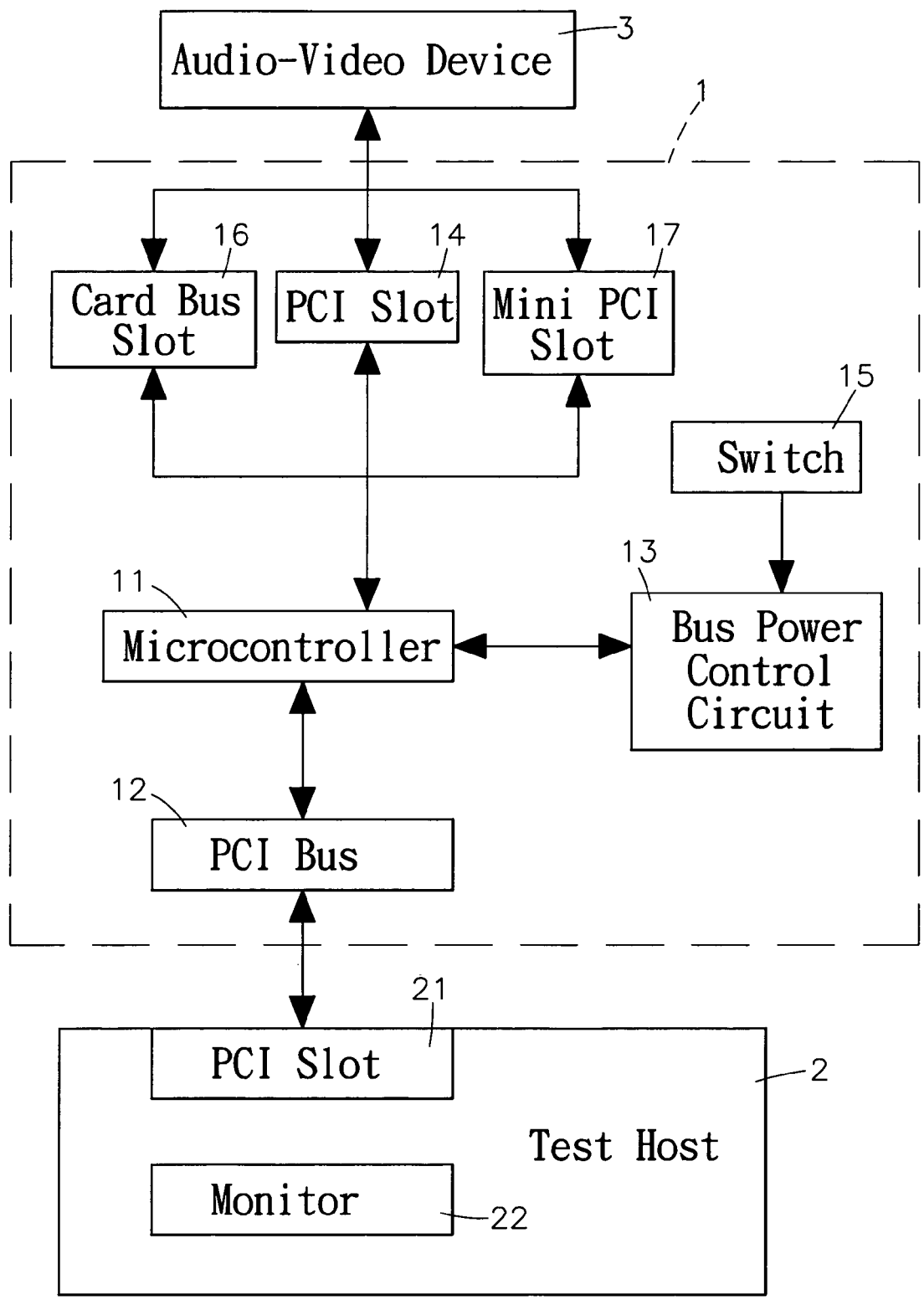
FIG. 7 is a block diagram illustrating a testing method according to another preferred embodiment of the present invention.

Referring to FIG. 7, the test interface card 1 is further comprising a card BUS slot 16 and a mini PCI slot 17 in order to enable the test interface card 1 to implement testing of various types of audio-video device 3 in the test host 2 without repeatedly turning on or off the test host 2. Thus, the time and cost of the testing can be substantially reduced.

Additionally, the audio-video device can be the TV card or the TV box.

Accordingly, the present invention has at least the advantages compared to the conventional art.

1. Because the Bus power control circuit 13 and the switch 15 are adopted for selectively cutting off or supplying power to the PCI slot 14, therefore it is possible to plug in the audio-video device 3 without shutting down the test host 2. Thus, the disadvantage of shutting down the test host 2 for plugging the audio-video device 3 as in the conventional art can be effectively avoided. Thus, the time and the cost of the testing can be substantially reduced.

2. Because the test interface card 1 is utilized for connecting to the test host 2, therefore it is possible for the test host 2 without hot plug function to perform the PCI hot plug function without using the higher level server. Thus, the overall cost can be effectively reduced.

While the invention has been described in conjunction with a specific best mode, it is to be understood that many alternatives, modifications, and variations will be apparent to those skilled in the art in light of the a foregoing description. Accordingly, it is intended to embrace all such alternatives, modifications, and variations, which fall within the spirit and scope of the included claims. All matters set forth herein or shown in the accompanying drawings are to be interpreted in an illustrative and non-limiting sense.

What is claimed is:

1. A test interface card, for use in a test host without a hot plug function, said test host adapted for implementing testing of an audio-video device without shutting down said test host; said test interface card comprising:
    a Bus power control circuit;
    a microcontroller, adapted for sensing a control status of said Bus power control circuit and transmitting a sensing result to said test host;
    a PCI slot;
    a PCI Bus, connected to said microcontroller and a PCI slot of said test host; wherein said Bus power control circuit is adapted for controlling a power supply to said PCI slot and said PCI slot is adapted for connecting with said audio-video device; and
    a switch, for controlling and emitting an on/off signal to said Bus power control circuit for selectively cutting off the power supply to said PCI slot so that testing of said audio-video device can be implemented without shutting down said test host.

2. The test interface card according to claim 1, wherein said switch comprises a photoelectric switch.

3. The test interface card according to claim 1, wherein said switch comprises a touch-tone switch.

4. The test interface card according to claim 1, wherein said switch comprises a twisting switch.

5. The test interface card according to claim 1, wherein said microcontroller is connected to a card BUS slot.

6. The test interface card according to claim 1, wherein said microcontroller is connected to a mini PCI slot.

7. The test interface card according to claim 1, wherein said audio-video device comprises a TV card.

8. The test interface card according to claim 1, wherein said audio-video device comprises a TV box.

* * * * *